(12) United States Patent
Juano

(10) Patent No.: US 12,247,553 B1
(45) Date of Patent: Mar. 11, 2025

(54) WATER DESALINATION AND ELECTRICAL POWER GENERATION UTILIZING GRAVITATIONAL FLOW AND GEOTHERMAL ENERGY

(71) Applicant: Stockton Geothermal Systems, Stockton, CA (US)

(72) Inventor: Derric Juano, Stockton, CA (US)

(73) Assignee: Stockton Geothermal Systems, Stockton, CA (US)

( * ) Notice: Subject to any disclaimer, the term of this patent is extended or adjusted under 35 U.S.C. 154(b) by 0 days.

(21) Appl. No.: 18/662,697

(22) Filed: May 13, 2024

Related U.S. Application Data

(63) Continuation of application No. 18/650,808, filed on Apr. 30, 2024.

(60) Provisional application No. 63/594,841, filed on Oct. 31, 2023.

(51) Int. Cl.
   *C02F 1/44* (2023.01)
   *F03G 4/00* (2006.01)
   *C02F 103/08* (2006.01)

(52) U.S. Cl.
   CPC .............. *F03G 4/069* (2021.08); *C02F 1/441* (2013.01); *F03G 4/029* (2021.08); *C02F 2103/08* (2013.01); *C02F 2201/009* (2013.01)

(58) Field of Classification Search
   CPC ........... F03G 4/023; F03G 4/029; C02F 1/441
   See application file for complete search history.

(56) References Cited

U.S. PATENT DOCUMENTS

2016/0312646 A1   10/2016   Juano

FOREIGN PATENT DOCUMENTS

KR   20200001038 A   *   1/2020

OTHER PUBLICATIONS

Kim et al—KR 2020-0001038 FIT Translation (Year: 2020).*

* cited by examiner

*Primary Examiner* — Bradley R Spies
(74) *Attorney, Agent, or Firm* — Jeffer Mangels; Butler & Mitchell LLP; Brennan C. Swain, Esq.

(57) ABSTRACT

A system for generating electricity and/or providing potable water. The system includes a subterranean shaft that extends into a geothermal reservoir and a volume of heat transfer fluid. Heat from the geothermal reservoir is transferred through a wall of the shaft and into the heat transfer fluid. The system includes a water intake conduit extending from the surface of the earth into the shaft interior. The water intake conduit includes proximal and distal ends and downward, return and upward portions. At least the return portion is positioned in the heat transfer fluid. Liquid water received through the proximal end of the water intake conduit moves downwardly along the downward portion and below the heat transfer fluid level. The liquid water is converted to steam via heat transfer from the heat transfer fluid through a wall of the water intake conduit. The steam moves upwardly along the upward portion of the water intake conduit and into the electrical generation stage, where electricity is generated.

14 Claims, 16 Drawing Sheets

0
WATER DESALINATION AND ELECTRICAL POWER GENERATION UTILIZING GRAVITATIONAL FLOW AND GEOTHERMAL ENERGY

CROSS-REFERENCE TO RELATED APPLICATIONS

This application is a continuation of U.S. patent application Ser. No. 18/650,808, filed Apr. 30, 2024, which claims the benefit of U.S. Provisional Application No. 63/594,841, filed on Oct. 31, 2023, the entireties of which are incorporated by reference herein.

FIELD OF THE INVENTION

The present invention relates to a system that utilizes gravitational flow and geothermal energy for water desalination and electrical power generation.

BACKGROUND OF THE INVENTION

It will be appreciated that current geothermal energy may be limited to only a hand full of locations on the planet that have a permeable rock geology. This may be a reason why geothermal energy has not progressed much. Current geothermal installations inject water into the geothermally active permeable rock, which is heated and then recovered via a recovery well then harnessed to make electricity. Current geothermal system's working fluids may become contaminated with harmful pollutants that are present in the Earth's crust and are subsequently released into the atmosphere or aquafer. Current systems may use separated injection and recovery wells and may place any reverse osmosis apparatus at sea level. Current systems use high-pressure pumps to push water molecules through a semi permeable membrane. Current systems may also have geothermal reservoirs close to the surface limiting their productiveness. The present invention addresses some or all of these issues, as discussed below.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention there is provided a system for generating electricity that includes a subterranean shaft defined from a surface of earth to a shaft bottom. The subterranean shaft defines a shaft interior and a shaft length between the surface of earth and the shaft bottom. At least a portion of the shaft extends into a geothermal reservoir. A geothermal reservoir is a geothermal heat source producing the required heat energy to operate the system, most likely comprised of superhot rock geology but that may not always be the case. A top of the geothermal reservoir defines a geothermal reservoir level. The system includes a volume of heat transfer fluid disposed in the shaft interior that defines a heat transfer fluid level. At least a portion of the volume of heat transfer fluid is disposed below the geothermal reservoir level. Heat from the geothermal reservoir is transferred through a wall of the subterranean shaft and into the volume of heat transfer fluid.

The system includes at least a first water intake conduit extending from the surface of the earth into the shaft interior. The first water intake conduit includes a proximal end, a downward portion, a return portion (or U-shaped portion), an upward portion and a distal end. The return portion, at least a portion of the downward portion and at least a portion of the upward portion are positioned in the volume of heat transfer fluid. The system also includes an electrical generation stage associated with the distal end of the water intake conduit. The water path is defined from the proximal end of the water intake conduit, through the downward portion, through the return portion, through the upward portion and to the electrical generation stage and distal end. Liquid water received through the proximal end of the first water intake conduit moves downwardly along the downward portion of the water intake conduit and below the heat transfer fluid level. The liquid water is converted to steam via heat transfer from the volume of heat transfer fluid through a wall of the first water intake conduit. The steam moves upwardly along the upward portion of the water intake conduit and into the electrical generation stage, where electricity is generated.

In a preferred embodiment, the system further includes a fluid duct disposed in the volume of heat transfer fluid. The fluid duct defines a fluid duct interior and includes an entrance and an exit. The downward portion of the water intake conduit extends through the entrance of the fluid duct and into the fluid duct interior. The upward portion of the water intake conduit is positioned outside of the fluid duct interior. The return portion may extend through a wall of the fluid duct or the return portion may be positioned outside and below the fluid duct. The electrical generation stage may include at least one turbine coupled to a generator for generating electricity from the steam. The subterranean shaft may include a generally constant diameter.

In a preferred embodiment, the system includes at least a first desalinating apparatus associated with the downward portion of the water intake conduit. The water path may include water moving through the first desalinating apparatus. The system also may include a bypass path (one or more conduits and possibly associated valves). The water path may include water moving through the first desalinating apparatus or water bypassing the first desalinating apparatus.

In a preferred embodiment, the first desalinating apparatus is positioned vertically within the downward portion of the water intake conduit, such that water moves to and through the first osmosis apparatus via gravity. The system may include a brine return system coupled to the first desalinating apparatus, the brine return system configured for moving brine from the first desalinating apparatus out of the subterranean shaft. In an embodiment, a first portion of the shaft below the heat transfer fluid level defines a first diameter, and the first desalinating apparatus is positioned in a portion of the subterranean shaft that defines a second diameter. The second diameter may be larger than the first diameter. The system may include at least a first hydroelectric generator associated with the downward portion of the water intake conduit, and wherein the water path includes moving through the first hydroelectric generator, whereby electricity is generated. The subterranean shaft may include a plurality of panels that at least partially define the shaft interior. The plurality of panels may include a first conductive panel section and a first insulative panel section. The first conductive panel section is located below the heat transfer fluid level, and the first insulative panel section is located above the first conductive panel section.

In a preferred embodiment, the present invention is embodied in a system for producing steam for the generation of electricity, the system being housed in a geothermal opening about 2000 feet below sea level, the system including a large diameter shaft lined with panel segments; heat transfer fluid, whereby geothermal heat is transferred through the panel segments to the heat transfer fluid; a reverse osmosis unit positioned adjacent the shaft; means for delivering salt water to the reverse osmosis unit; means for delivering steam resulting from heat transferred to the heat transfer fluid to the earth's surface; and means for converting the steam into electricity.

The present invention does not require permeable rock to operate, but requires a geothermal reservoir, which, as will be appreciated by those of ordinary skill in the art, is located readily throughout the Earth's crust. The present invention preferably may include a relatively large diameter shaft lined with prefabricated structural panel segments extending down to a geothermal reservoir. Water or other types of working fluids flow down the shaft and absorb geothermal heat through the shaft walls, thus heating the water or working fluid into steam. The steam flows back to the surface and is harnessed to generate electricity. The present invention may also desalinate seawater using the reverse osmosis process, but preferably without the need for expensive power consuming pumps. Instead, the present invention uses gravitational flow to achieve the relatively high pressure needed to pass water molecules thru the permeable membrane. It is capable of achieving this because the reverse osmosis apparatus may be located at any depth to achieve optimal performance approximately 2000 feet below sea level with current reverse osmosis systems.

As stated above, current global geothermal energy extraction has been limited to only a few locations worldwide and the desalinization of seawater using reverse osmosis is extremely costly making it financially unfeasible for most communities. The invention described and claimed here preferably solves both problems. The present invention utilizes a relatively large diameter vertical shaft lined with prefabricated structural panel segments.

In a preferred embodiment, the constructed shaft descends a distance (preferably one or more miles) below the surface to a geothermal reservoir. In a preferred embodiment, the bottom portion of the shaft is filled with a heat transfer fluid, or other suitable materials, that in use is heated through the shaft walls by the geothermal reservoir. During use, pretreated seawater descends down the shaft through plumbing located within the shaft to the reverse osmosis apparatus located approximately 2000 feet below sea level. The reverse osmosis process creates desalinated water from the seawater it receives using gravitational flow and the desalinated seawater continues flowing through conduit downward through the heat transfer fluid that has been previously heated up through the shaft walls. The desalinated seawater is heated by the heat transfer fluid by conduction through the conduit and transforms it into steam. The conduit bends back upward and the steam flows to the surface to be harnessed for generating electricity.

In a preferred embodiment, the present invention uses a single shaft that includes or contains both the water intake and steam exhaust. The present invention absorbs heat through the shaft walls to heat the working fluid and positions or places the reverse osmosis apparatus approximately 2000 feet below sea level. The present invention uses gravitational flow and can be located at virtually any location on the planet. The invention may use free gravitational flow over costly energy consuming pumps to push seawater molecules thru the reverse osmosis semi permeable membrane. The present invention may cost less to operate than prior art systems due to its compactness compared to conventional systems that may sprawl over many square miles of area. Preferably, the present invention does not harm or at least limits harm to the atmosphere or aquafers because it is a semi-closed system in which the working fluid is contained within the sealed shaft and preferably does not come into contact with the Earth's crust.

It will be appreciated that the present invention is an improvement from what currently exists. Having a single shaft that preferably contains both the injection well and recovery well preferably requires less land, thus reducing costs for those utilizing the system. The invention can be placed virtually anywhere on Earth because it absorbs geothermal heat from geothermal reservoirs that are located abundantly throughout the Earth's crust and not just at or near permeable rock geology, which is located only in a few places globally. Many current systems pollute the atmosphere and ground water aquafers because the working fluid comes into direct contact with the rock geology containing the pollutants, whereas the present invention is considered to be safer for the environment because it is a semi-closed system and as such preferably has little to no contact with the rock geology.

In a preferred embodiment, the present invention costs less to operate because it utilizes free gravitational flow to achieve the high-pressure needed in the reverse osmosis process and minimizes or eliminates costly energy consuming pumps. It is possible that the present invention has the potential to replace fossil fuel as the world's main energy source of the future unlike current geothermal energy systems which only account for a small percentage of the world's energy supply. The present invention is preferably 100% renewable and can produce electricity up to twenty-four hours a day, unlike solar or wind which are limited to when the sun is out or when the wind is blowing. The present invention has the capability to produce electricity in abundance and preferably cheaper than other energy sources, thus making it feasible to make hydrogen fuel. The present invention may also add precipitation to the atmosphere by releasing the steam generated directly into the atmosphere, thereby creating rain or snow and hopefully further reducing global warming. It is thought that the present invention may speed the reversal of global warming by providing a 100% carbon free electricity to developing direct air capture technologies currently using fossil fuel energy sources.

In a preferred embodiment, the present invention is a system for electrical power generation utilizing geothermal energy and water desalination by reverse osmosis utilizing gravitational flow. The present invention taps into the unused geothermal reservoirs located thousands of feet below the Earth's surface by using a shaft boring machine. The system may be located relatively anywhere on the surface of the planet suitable for geothermal drilling. The system preferably can desalinate seawater on a large scale while making electricity. The system preferably may also make it economically feasible to manufacture hydrogen fuel, extract valuable minerals from brine, and help clean the oceans by extracting pollutants from the brine as well. U.S. Patent Publication No. 2016/0312646 is incorporated by reference herein in its entirety.

To make at least a portion of the invention, the shaft is bored using a shaft boring machine or possibly by other means as new boring technology becomes available. As the shaft boring machine travels downwardly, it places the prefabricated structural panels along the inside perimeter or surface of the shaft. Some panels may have removable insulation attached to them at the extremely hot portions of the shaft. The annular space between the rock face and the prefabricated panels may be filled with a sealing material, such as grout, after the panels are installed. The panels or panel segments may also be directly placed in direct contact with the rock geology and attached, for example, by rock anchors or other means. The rocks or other material at a portion of the shaft may be in contact with the geothermal reservoir and heat may then be transferred from the geothermal reservoir, through the rocks, through panels, if present, and into the heat transfer fluid. Once the shaft is complete the shaft boring machine is backed out of the shaft or disassembled and removed piece by piece. The high-pressure steam conduit, heat transfer fluid duct, the one or more reverse osmosis apparatuses, seawater intake pipe, and brine return pipe can now be installed in the shaft. At the surface the pre and post-water treatment facilities may be constructed along with the power generation station. When the shaft is ready for operation the temporary insulation may be removed from the panels and the heat transfer fluid added to the fluid transfer reservoir portion of the shaft. The panels may be concrete, metal, a combination or other material (or a combination of materials) and the panels may be secured together, e.g., via bolting, welding, adhering or other connecting or securing method.

The present invention allows pretreated seawater to enter the system. The water exits the system desalinated and aiding in producing electricity. The invention produces electricity and water using 100% renewable energy, thus significantly reducing the cost of making electricity and water which may make it economically feasible to produce hydrogen fuel. The present invention may also be useful for snow making. The invention can be used to add precipitation to the atmosphere. If the invention is located in a region where the temperature is at or below freezing, such as the Arctic, and the high-pressure steam is released directly into the atmosphere, snow will be created. This may help directly reverse the effects of global warming by replenishing the polar ice caps. The leftover brine from the reverse osmosis process can be processed economically removing all the valuable minerals before its returned back to the sea. The ocean has many pollutants, many as a result of burning fossils fuels or micro plastics. Now these pollutants may be extracted and stored safely. The leftover brine can be processed economically using the abundant electricity produced to remove these harmful pollutants before returning back to the sea.

An apparatus for generating electricity and desalinating water is disclosed, which utilizes one or more subterranean shafts to convey seawater down to an operating depth at which the water located in a shaft that is submerged in a heat transfer fluid turns the water to steam. The steam rises to the surface through the conduit and drives one or more turbines to generate electricity. A desalinating stage may be present prior to the water dropping low enough to be heated to steam. The desalinated water after turning to steam travels upwardly to steam turbine equipment and then to a condensation facility at the surface which condenses the desalinated steam back into pure liquid water for distribution. Power is also generated from the rising steam.

DETAILED DESCRIPTION OF THE PREFERRED EMBODIMENTS

Figure 1:
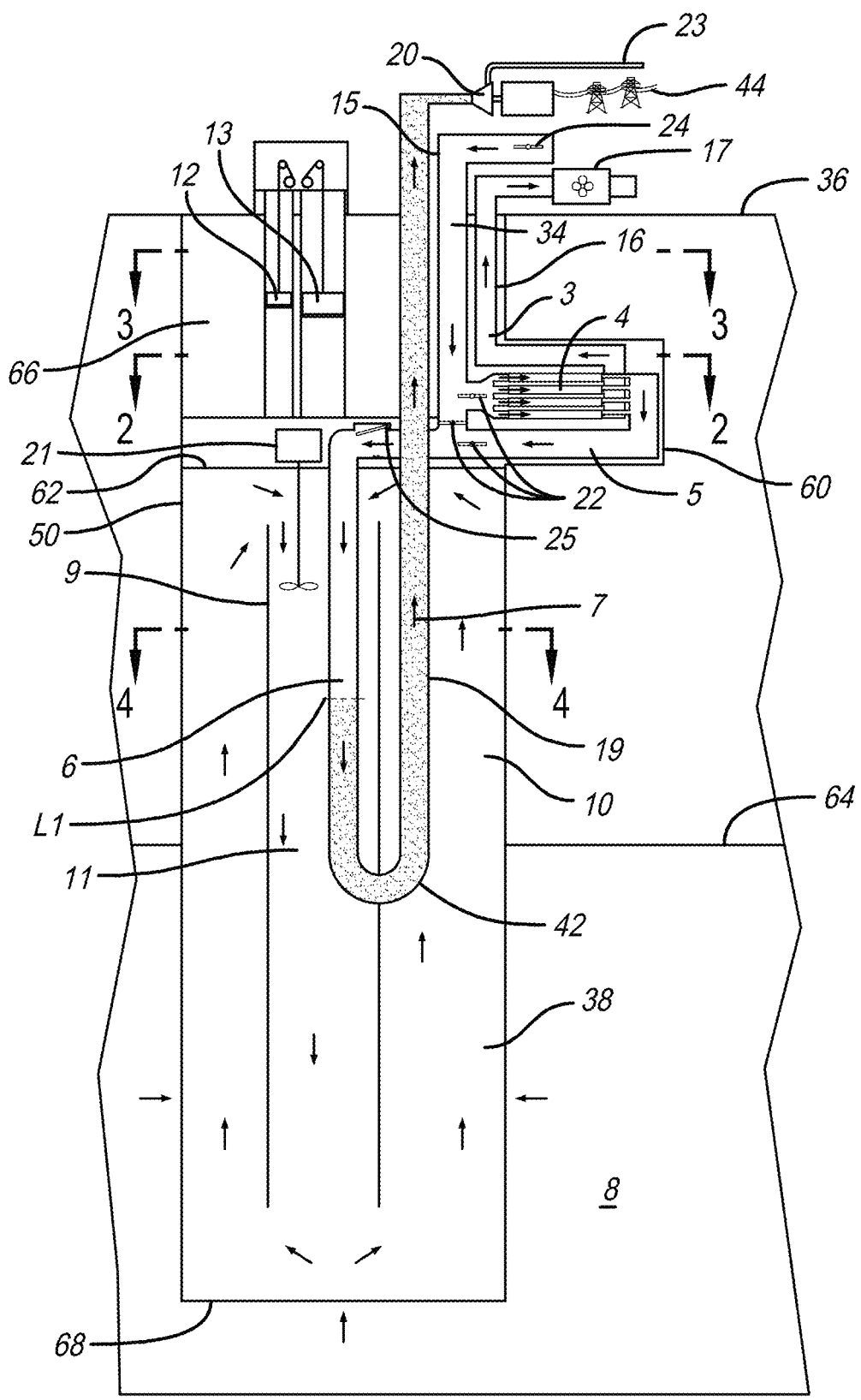
FIG. 1 is a diagram of a system for generating electricity within a subterranean shaft in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

In the present disclosure, electricity and potable water can be generated without any significant pollution output. The system is configured to convey water from a source (e.g., ocean water, sea water, etc.) through pipes in one or more, but preferably a single deep shaft thousands of feet below surface. Preferably the system includes the ability to produce steam for the generation of electricity, the large diameter shaft of the system is bored into and extends into a geothermal reservoir. The large diameter shaft may be at least partially lined with panel segments and includes heat transfer fluid in a bottom portion of the shaft. The geothermal heat may be transferred through the panel segments to the heat transfer fluid. The bottom portion of the shaft that houses all or a portion of the heat transfer fluid may or may not require tile segments. If tile segments are not included, this allows the heat transfer fluid to come in direct contact with the hot geothermal rock increasing the conductivity of the heat from the rock to the heat transfer fluid, which may reduce the overall cost of the system and still provide a closed system. A reverse osmosis unit positioned in or adjacent to the shaft. The system includes one or more pipes, conduits or other means for delivering salt water to the reverse osmosis unit, one or more pipes, conduits or means for delivering steam resulting from heat transferred from the heat transfer fluid to the water to create steam that is delivered to the earth's surface; and means for converting the steam into electricity.

As shown in FIGS. 1-6, in a preferred embodiment, the present invention includes a shaft 50 that has been bored generally radially into the Earth. The shaft 50 includes a shaft bottom 68. The shaft 50 is a large diameter shaft that may be bored by a shaft boring machine. Other means for boring the shaft may also be used. Preferably the shaft is lined with a plurality of pre-fabricated panels 102 or panel segments (see FIG. 3). The shaft 50 lined with the panels descends thousands of feet into and below Earth's surface into a geothermal reservoir 8. In a preferred embodiment, the shaft 50 may have an annular space between the segments and the rock face (the inside surface of the bored shaft) that is filled with a sealing material 104, such as grout, that seals and supports the interior portion of the shaft 50 from contaminates contained within the Earth's crust. The shaft 50 houses a multitude of components, including the intake seawater conduit 15, the reverse osmosis apparatus 4, the high-pressure steam conduit 19, and the heat transfer fluid (labeled as heated heat transfer fluid 10 and cooler heat transfer fluid 11 in the drawings and described further below.

The shaft wall is preferably constructed of prefabricated structural panel segments or panels 102, as discussed above. In an exemplary embodiment, the panels 102 are made of concrete and/or steel or other suitable material. Some panels or panel segments may be of a conductive nature and some panels may be of an insulative nature based on their location within the length of the shaft. For example, at the bottom most portion of the shaft the panel segments may be of a conductive composition, but at some point the segments may change to an insulative composition to help retain the heat of the heat transfer fluid so it does not escape into the surrounding rock geology or portions of the shaft may be kept cooler due to equipment operation or personnel comfort. Accordingly, the shaft may include at least one or a first conductive panel section or portion along its length (and at the bottom) and at least one or a first insulative panel section or portion along its length. With this arrangement, heat may be transferred in to the heat transfer fluid from the bottom of the shaft and then retained within the heat transfer fluid above a predetermined location as a result of the first insulative panel section through the conductive panel section and then retained. The panels 102 may be interlocking and can be bolted, welded or otherwise connected or secured together and may be installed by the shaft boring machine.

Seawater is preferably the working fluid of the system. Potable water can be substituted for the working fluid if the reverse osmosis process is omitted or bypassed, as discussed below. Seawater intake pipe 15 is conduit, a large portion of which extends vertically, located inside the shaft 50 and that conveys pretreated seawater from a body of water at the Earth's surface 36 to the desalinating apparatus, reverse osmosis unit or apparatus 4 that is preferably located approximately 2000 ft below sea level. The reverse osmosis apparatus 4 is used for separating salt and other properties from ocean water using a semi-permeable membrane through which the water passes. After passing through the semi-permeable membrane, the output produced includes desalinated water 5 and a brine 3. The brine 3 is a byproduct created during the reverse osmosis process and includes highly concentrated salt water and other properties. As shown in FIG. 1, the reverse osmosis apparatuses 4 may be located at a level within the shaft where there is an increased diameter or chamber 60 that houses the reverse osmosis apparatuses 4 and other possible components. Although not shown in FIG. 1, any subsystem on the right side of the figure would also extend into a larger diameter chamber 60.

A brine return pipe 16 may be used to convey the brine produced from the reverse osmosis to the surface. A brine return pump 17 may be used to aid in conveying the brine to the surface. Desalinated seawater (designated 5 in the figures) is essentially potable water that is a product of the reverse osmosis and is also used as a working fluid of the system, as described further below. The high-pressure steam conduit 19 conveys the desalinated seawater from the reverse osmosis apparatus 4 downward into and through the heat transfer fluid 10 and 11 and then back upward to the surface. The heat transfer fluid defines a heat transfer fluid level 62 and the geothermal reservoir defines a geothermal reservoir level 64. The shaft 50 defines a shaft interior 66. The steam conduit 19 absorbs heat by conduction from the heated heat transfer fluid 10 and 11, thus transferring the heat to the desalinated seawater (desalinated water that is having heat transferred therein is designated as heating desalinated water 6 in the drawings) and transforming it into steam or high-pressure steam 7. A dashed line L1 is shown in the figures to indicate where the water turns to steam. The line is in an exemplary location and it will be appreciated that water may turn to steam anywhere within the steam conduit 19 and within the heat transfer fluid. The heat transfer fluid absorbs heat (from the geothermal reservoir 8) and through the shaft wall(s) by conduction. The shaft is preferably filled with heat transfer fluid 10 and 11 from below the reverse osmosis apparatus 4 to the bottom of the shaft 50.

In a preferred embodiment, the shaft 50 includes a heat transfer fluid duct 9 disposed therein that helps directs the flow of the heat transfer fluid 10 and 11 more efficiently. As shown in FIG. 1, the heated heat transfer fluid 10 moves or rises upwardly through the heat transfer fluid duct 9, heats the water in the steam shaft 7, and then the cooler heat transfer fluid (after some heat has been transferred out) flows or moves downwardly, as shown by the arrows in FIG. 1, where it is reheated by the geothermal reservoir 8. The heat transfer fluid may move upwardly by natural convection along the outer portion of the lower shaft and a fluid recirculating pump 21 may be used to increase the flow of the heat transfer fluid 10 and 11 within the heat transfer fluid reservoir 38. Steam turbine 20 is a turbine driven by the high pressure steam and is coupled with a generator to produce electricity. The condensate water 23 is water that has condensed from the steam after processing in the steam turbine 20. The condensate water 23 may be processed further for drinking, irrigation or the like. Flow valve 24 may control the amount of pretreated seawater entering the system and backflow preventer 25 keeps desalinated water or steam from flowing back up the system. It should be appreciated that any type of valve is within the scope of the present invention. Butterfly valves are shown in the drawings, however, ball, gate, globe, or other types of valves may be used depending on application suitability.

The geothermal reservoir is designated 8 in the figures and, as will be appreciated by those of ordinary skill in the art is a thermal energy source located thousands of feet below the Earth's surface within the Earth's crust and is capable of supplying sufficient heat energy to support the system. The arrows within geothermal reservoir 8 are intended to show the heat from the geothermal reservoir transferring into the heat transfer fluid within the shaft.

Figure 6:
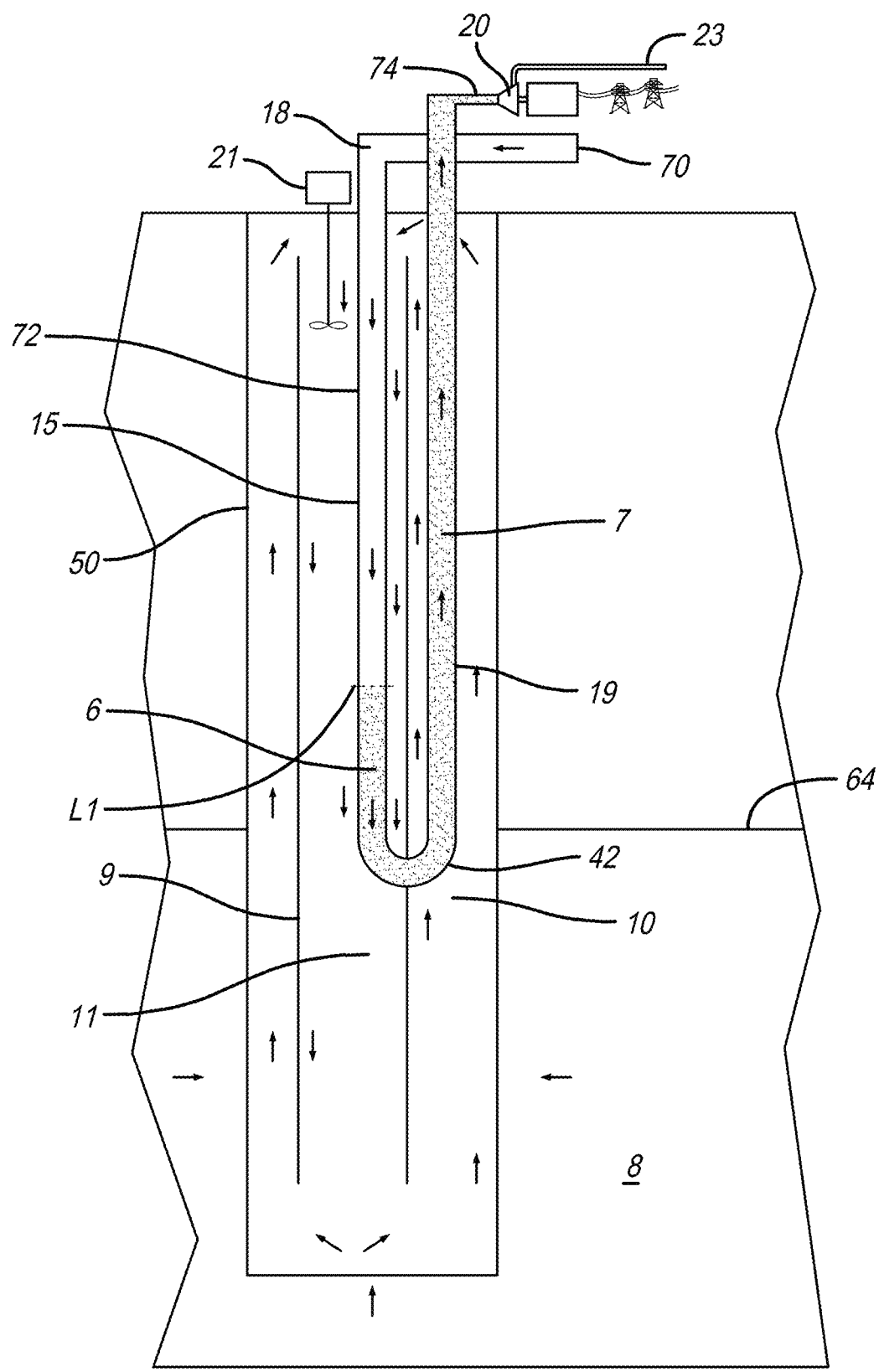
FIG. 6 is a diagram of another system for generating electricity within a subterranean shaft in accordance with a preferred embodiment of the present invention.

In an exemplary use of the invention, seawater 34 enters a water treatment facility at the surface and the pretreated seawater 34 enters the system via the seawater intake pipe 15 and the seawater 34 flows from the water treatment facility down the seawater intake pipe within the shaft 50 to the reverse osmosis apparatus 4, which is preferably located approximately 2000 feet below sea level. At this depth the pressure of the seawater is sufficient to pass only the water molecules thru the semi-permeable membrane within the reverse osmosis apparatus 4. The now desalinated seawater 5 exits the reverse osmosis apparatus 4 and continues downward via the high-pressure steam conduit 19. As is shown in FIG. 1, at least a portion of the high-pressure steam conduit 19 is submerged in the heat transfer fluid. The heat transfer fluid 10 is extremely hot as it has absorbed the heat from the geothermal reservoir 8 thru the shaft wall. The desalinated seawater travels down the high-pressure steam conduit 19 and absorbs heat transferred from the heat transfer fluid 10 and 11 until it transforms into high-pressure steam 7. Note the line designated L1 that provides an exemplary location where the desalinated water may transform into steam 7. The high-pressure steam conduit 19 bends back upwards at return portion or U-shaped portion 42 and is then transferred upwardly through the high-pressure steam conduit to the surface. It will be appreciated that the upward portion of the steam pipe may have steam traps located along its length to remove condensation that accumulates in the conduit. As shown in FIG. 6, the water intake conduit 15 includes a proximal end 70, a downward portion, 72 the return portion or U-shaped portion 42, an upward portion or the high-pressure steam conduit 19 and a distal end 74.

The high-pressure steam 7 then enters and powers the steam turbine generator 20 to produce electricity. Note the electrical lines 44 in FIG. 1. The condensate water 23 resulting from the steam running through the steam turbine generator 20 is piped away as desired. The brine 3 produced by the reverse osmosis process is conveyed back to the surface via the brine return pipe 16 to be processed before being returned back to the ocean.

Figure 2:
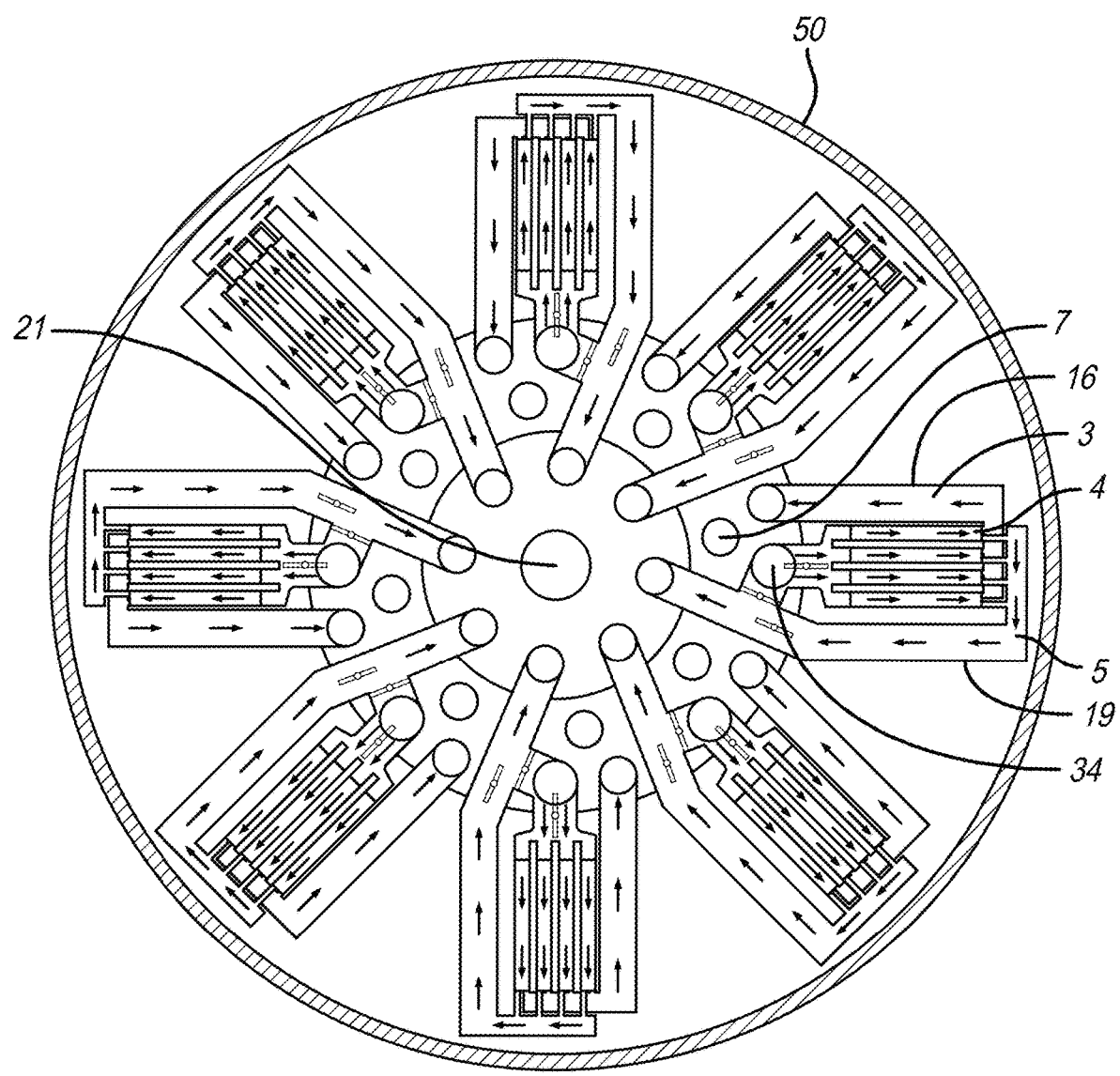
FIG. 2 is a cross-section taken along line 2-2 of FIG. 1.
Figure 3:
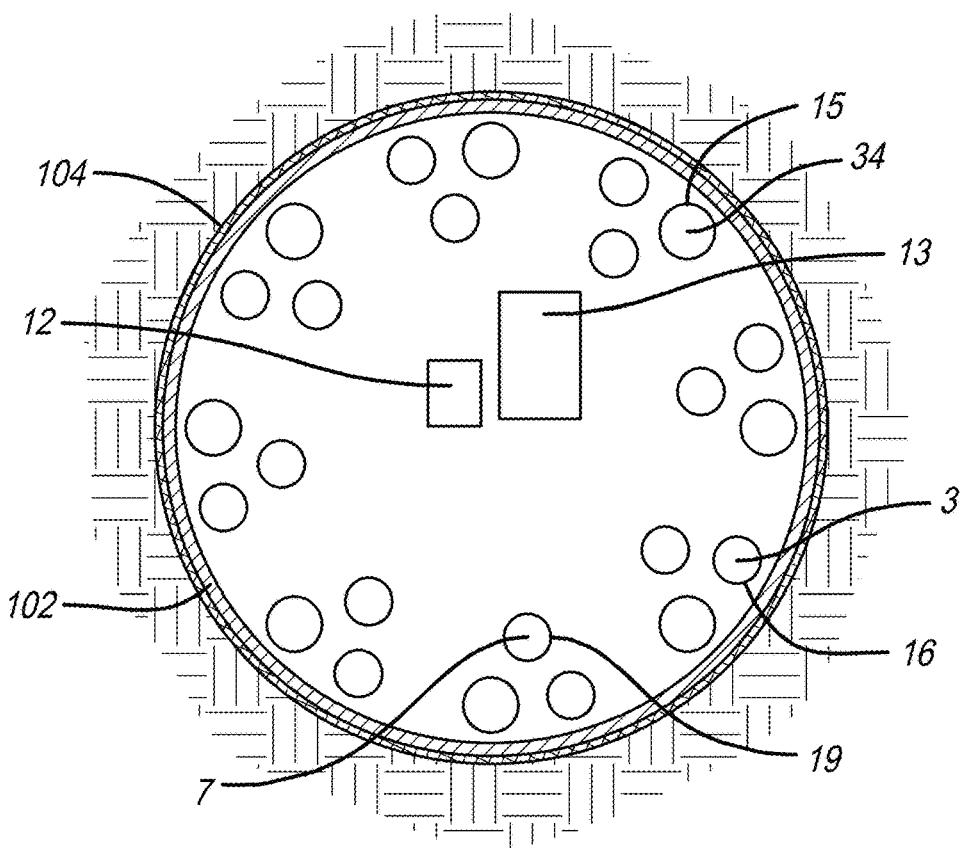
FIG. 3 is a cross-section taken along line 3-3 of FIG. 1.
Figure 4:
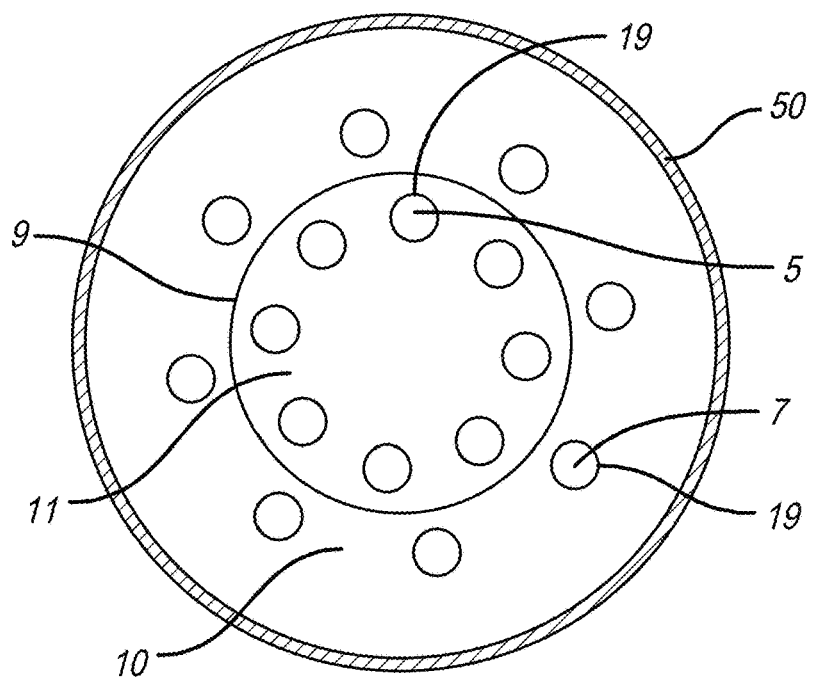
FIG. 4 is a cross-section taken along line 4-4 of FIG. 1.

For clarity purposes, FIG. 1 only shows a single subsystem. FIG. 2 is a cross-section taken along line 2-2 in FIG. 1, which extends through the reverse osmosis apparatus 4. It will be appreciated that for simplicity, FIG. 1 only shows a single reverse osmosis apparatus 4. FIG. 2 shows that a number of subsystems and associated components for generating potable water and electricity can be included in a single shaft 50. FIG. 2 shows eight subsystems and the reverse osmosis apparatuses 4 and associated components for generating potable water and electricity. FIG. 3 is a cross-section taken along line 3-3 in FIG. 1 and FIG. 4 is a cross-section taken along line 4-4 in FIG. 1.

Figure 5:
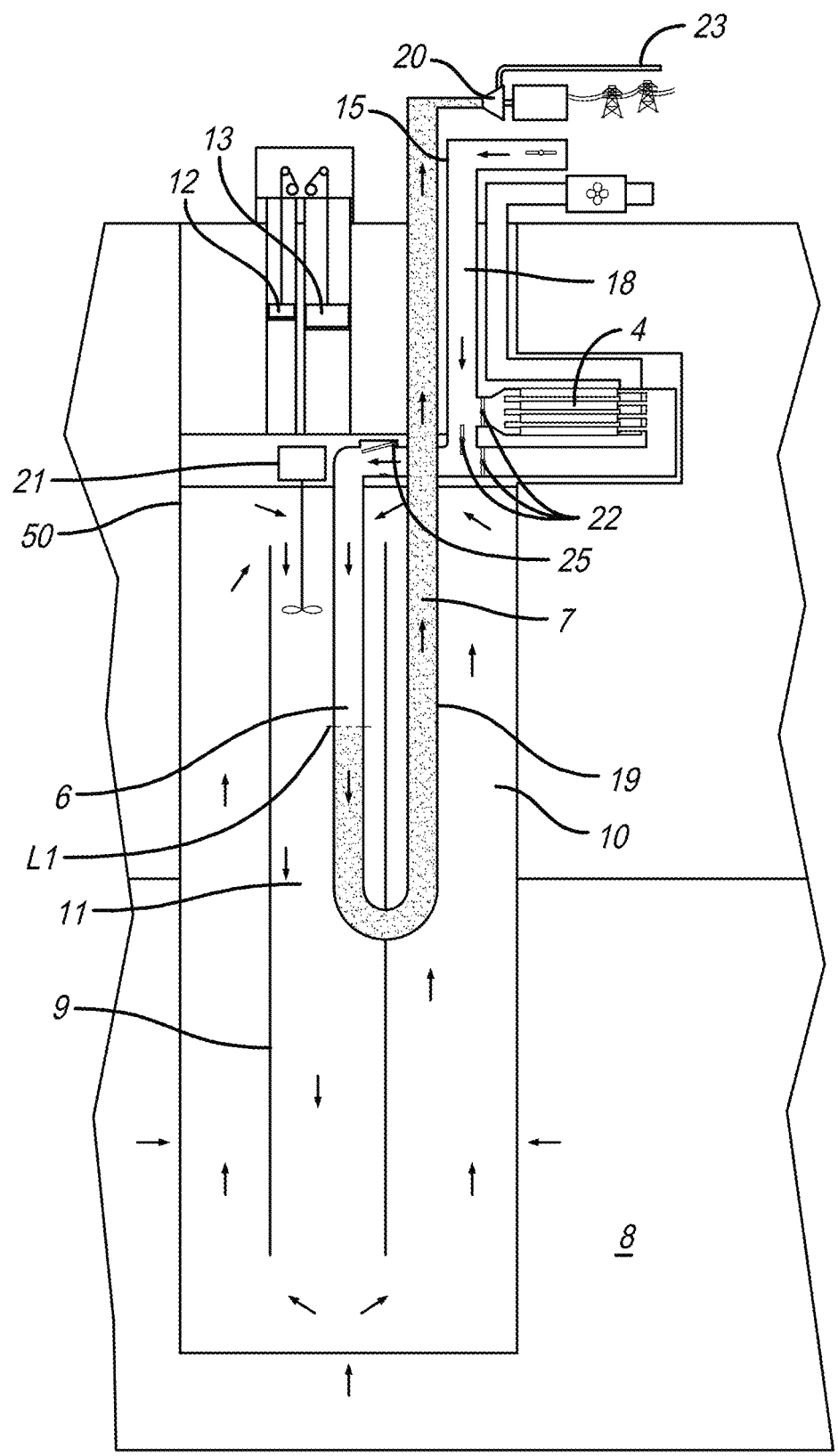
FIG. 5 is a diagram of the system for generating electricity of FIG. 1 in bypass mode.

In various embodiments, some of the elements or components may be omitted. For example, in an embodiment, the reverse osmosis apparatus may be omitted or it may be optional. The reverse osmosis apparatus may be included in the system, but may be bypassed. FIG. 5 shows the system in bypass mode, where the reverse osmosis apparatus 4 is bypassed. Note the arrangement of valves 22 to allow the bypass. Note also the arrows showing the flow of the water past the reverse osmosis apparatus 4. Also note the arrangement of valves 22 in FIG. 1 to route the saltwater into the reverse osmosis apparatus 4. The present invention may be configured to just make electricity only by omitting the reverse osmosis apparatus 4 and using fresh water as the working fluid. This variation may be a closed system. Condensed water from the steam generator descends from the surface and flows thru the water intake pipe/high-pressure steam pipe absorbing heat from the heat transfer fluid, transforming the water into high-pressure steam. The high-pressure steam travels back to surface to the steam turbine generator making electricity. The steam is condensed back into water after it exits the steam turbine generator and the cycle may then be repeated.

FIG. 6 shows the omission of the reverse osmosis apparatus. Note the diameter of shaft 50 is generally constant or the same throughout. This makes it easier to create or drill the shaft and also may be less expensive when creating the shaft. FIGS. 1-6 generally show a single shaft 50 injection and recover well utilizing a reverse osmosis system for seawater desalinization and a heat transfer fluid for geothermal power generation. FIG. 6 shows a single shaft injection and recovery well utilizing heat transfer fluid for geothermal power generation.

In another embodiment, the heat transfer fluid duct or the heat transfer fluid recirculating pump may be omitted. In a preferred embodiment, the shaft may be configured to be same diameter from top to bottom depending on the equipment used, such as if the system is used or constructed without the reverse osmosis apparatus. The system with reverse osmosis apparatus may require the shaft to be of a larger diameter above the reverse osmosis apparatus to allow room for the equipment to pass down the shaft to its installed location. However, this is not a limitation on the invention. The shaft may also need to be enlarged by excavation at the level where the reverse osmosis equipment is located.

As shown in FIG. 1, the present invention may also include maintenance and personnel lifts or elevators (see personnel elevator 12 and equipment elevator 13). The reverse osmosis version of the system may require personnel to operate and maintain the reverse osmosis equipment 2000 feet below the surface. The system may therefore have a lift or multiple lifts to carry personnel and equipment to this level. It will be appreciated that there may be sensors throughout the system so personnel or equipment can monitor some or all components for information regarding whether certain parameters are being exceeded so the personnel can make the necessary adjustments needed to allow the system to run efficiently and safely. Additional plumbing may be needed. For example, there may need to be bypass plumbing at certain locations to allow the system to continue to operate while equipment is down for maintenance or repair.

The system may include pre-treatment and post-treatment facilities. The system requires the pretreatment of seawater before it enters the reverse osmosis apparatus and the possibly the post-treatment of the desalinated water/steam after it leaves the steam turbine and is condensed back into water. In another embodiment, the reverse osmosis apparatus may be installed at the surface. However, this may omit the benefit of using gravitational flow of the water to overcome the high pressure needed to press the water molecules thru the semi permeable membrane of the reverse osmosis process.

Figure 7:
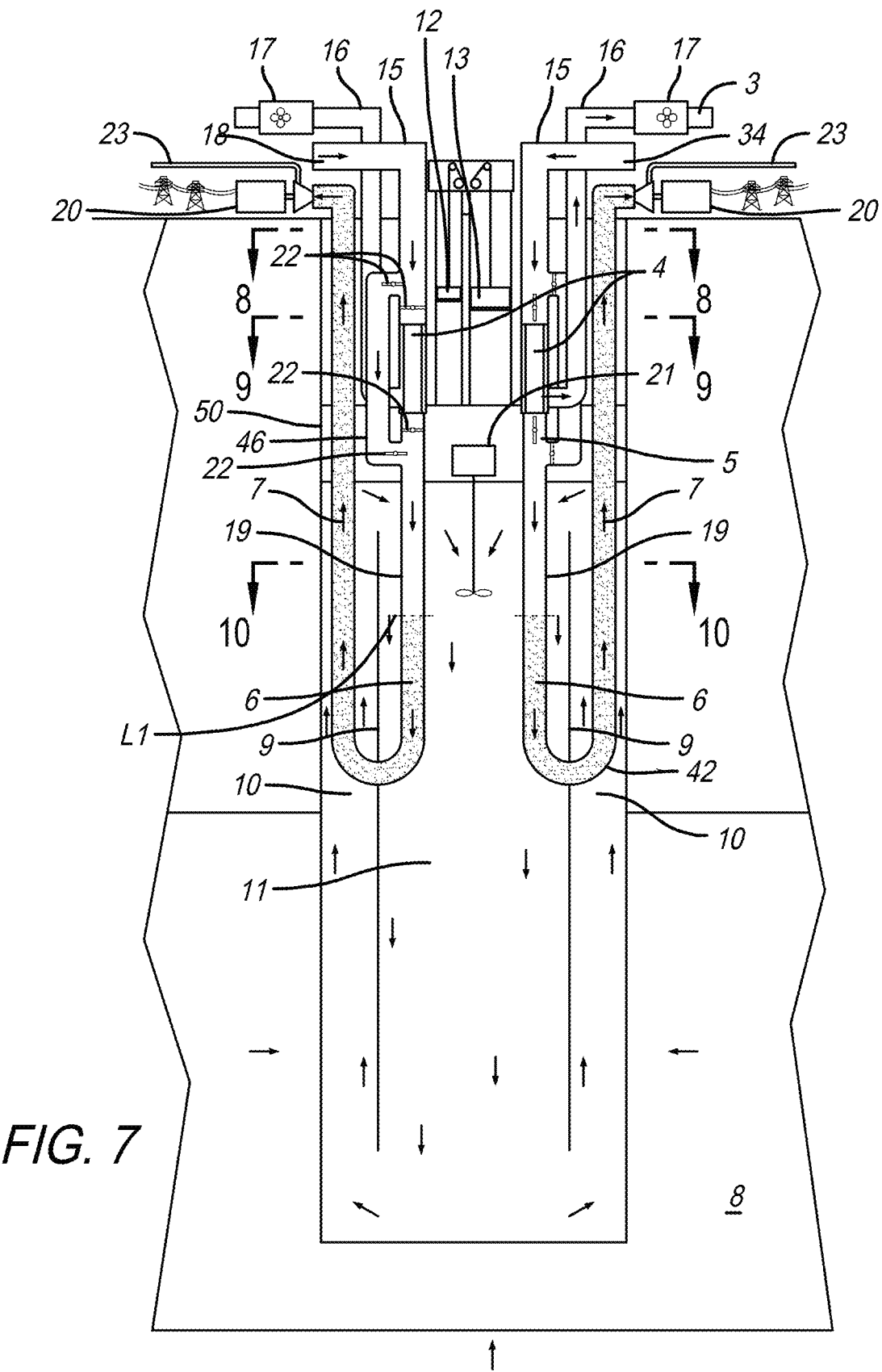
FIG. 7 is a diagram of another system for generating electricity within a subterranean shaft in accordance with a preferred embodiment of the present invention.

FIGS. 7-11 show another embodiment of the present invention that includes a system for generating electricity and providing potable water and other advantages, as described above with respect to the embodiments shown in FIGS. 1-6. This embodiment includes gravitational flow for desalinating seawater (due to the positioning of the reverse osmosis apparatuses 4 in a vertical orientation) and utilizing geothermal energy for steam turbine power generation housed in a constructed shaft. FIG. 7 shows two subsystems (oriented right and left in the figures) extending into a single shaft 50 that has been drilled into the earth. FIG. 7 shows the reverse osmosis apparatuses 4 vertically oriented within the intake seawater conduits 15 of the left and right subsystems. This allows the shaft 50 to have a generally constant diameter compared to the embodiment shown in FIG. 1. The system on the left is show in bypass mode where the water bypasses the reverse osmosis apparatus 4. Note the orientation of valves 22. The non-saltwater or bypass water 18 enters the intake conduit 15 and bypasses the reverse osmosis apparatus 4 based on the orientation of valves 22 (or other arrangement) and travels or moves through bypass pipe 46. The system on the right shows the saltwater running through the reverse osmosis apparatus 4.

As shown in FIG. 7, the portion of the intake conduit 15 where the water flows downwardly is closer to the center of the shaft (i.e., inboard) and the portion of the intake conduit 15 where the steam rises is further from the center of the shaft (i.e., outboard). With the arrangement, the intake conduit 15 flows into the fluid duct 9 in the heat transfer fluid and more particularly to the relatively cooler heat transfer fluid 11 toward the center of the shaft. As the water is heated and makes the bend in the U-shaped portion 42, any remaining water turns to steam as the intake conduit 15 moves to the hotter heat transfer fluid 10 that is closed to the wall of the shaft and closer to the geothermal reservoir 8. It will be appreciated that natural convection will cause the heat transfer fluid to move as the arrows therein show. The arrows within the heat transfer fluid 10 and 11 are included to show this convective flow, which is also aided by the fluid circulating pump 21.

Figure 8:
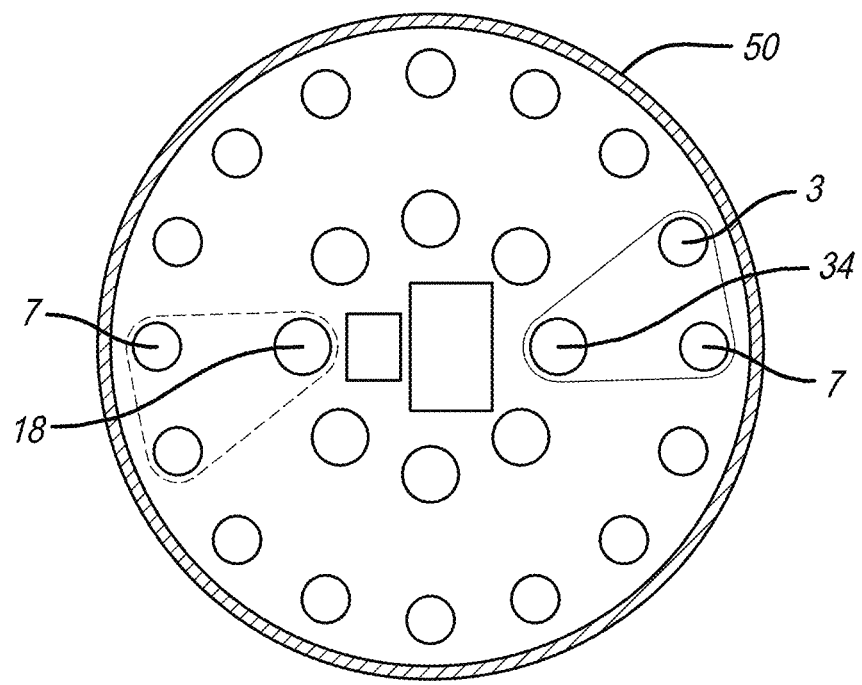
FIG. 8 is is a cross-section taken along line 8-8 of FIG. 7.
Figure 9:
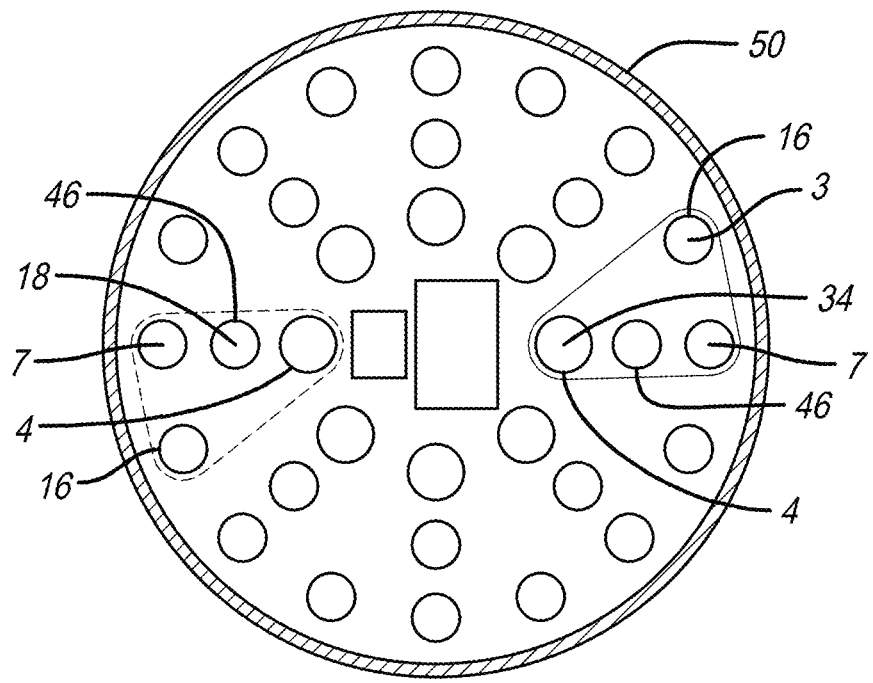
FIG. 9 is a cross-section taken along line 9-9 of FIG. 7.
Figure 10:
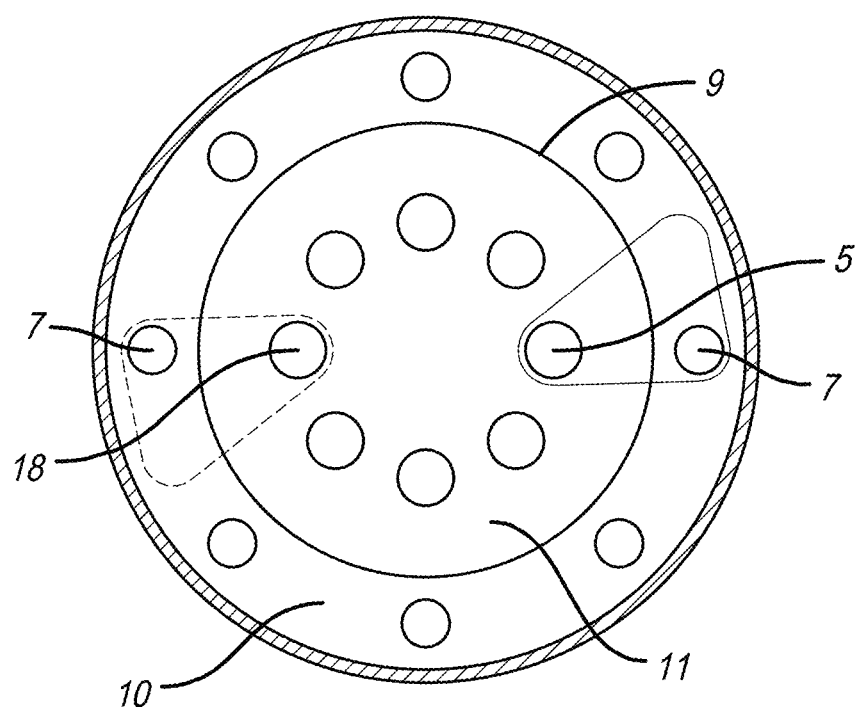
FIG. 10 is a cross-section taken along line 10-10 of FIG. 7.

FIG. 8 is a cross-section taken along line 8-8 in FIG. 7 and shows one of the subsystems in bypass mode within dashed lines. FIG. 9 is a cross-section taken along line 9-9 in FIG. 8 and also shows one of the subsystems in bypass mode within dashed lines. FIG. 10 is a cross-section taken along line 9-9 in FIG. 8 and also shows one of the subsystems in bypass mode within dashed lines.

Figure 11:
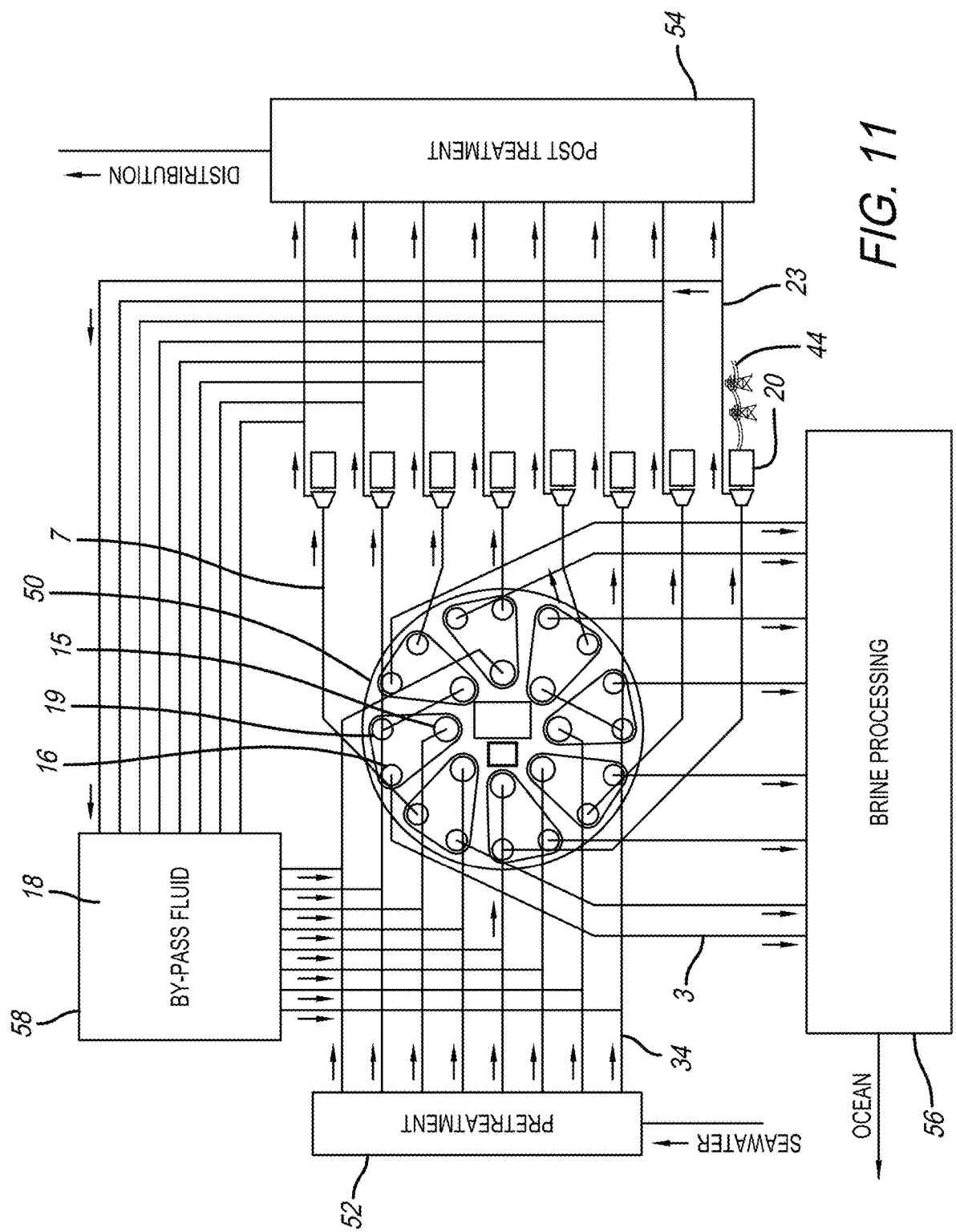
FIG. 11 is a schematic diagram of the system of FIG. 1 7 and including pretreatment and posttreatment facilities.

FIG. 11 shows a pre-treatment facility 52 and a post-treatment facility 54, a brine processing facility 56 and bypass fluid storage 58 together with a shaft 50 that includes a eight subsystems therein. The intake conduit 15 (for either seawater or bypass/non-seawater fluid 18), steam conduit 19 and brine return pipe 16 are numbered and shown. The paths of condensate water 23, brine 3, seawater 34 and bypass fluid 18 are also shown. The system may require the pretreatment of seawater before it enters the reverse osmosis apparatus 4 and the possibly the post-treatment of the desalinated water/steam after it leaves the steam turbine 20 and is condensed back into water. In any of the embodiments discussed herein or in an combination of embodiment, as they are all interchangeable with respect to the components or portions of each, A hydropneumatic water hammer preventer or similar device may be incorporated into the system's plumbing to minimize water hammer caused by valves opening and closing or other possible causes of fluctuations in water flow which could harm the system. Water hammer arrestor devices may be located throughout the plumbing to reduce and/or eliminate the harsh forces created during the opening and closing of valves.

Figure 12:
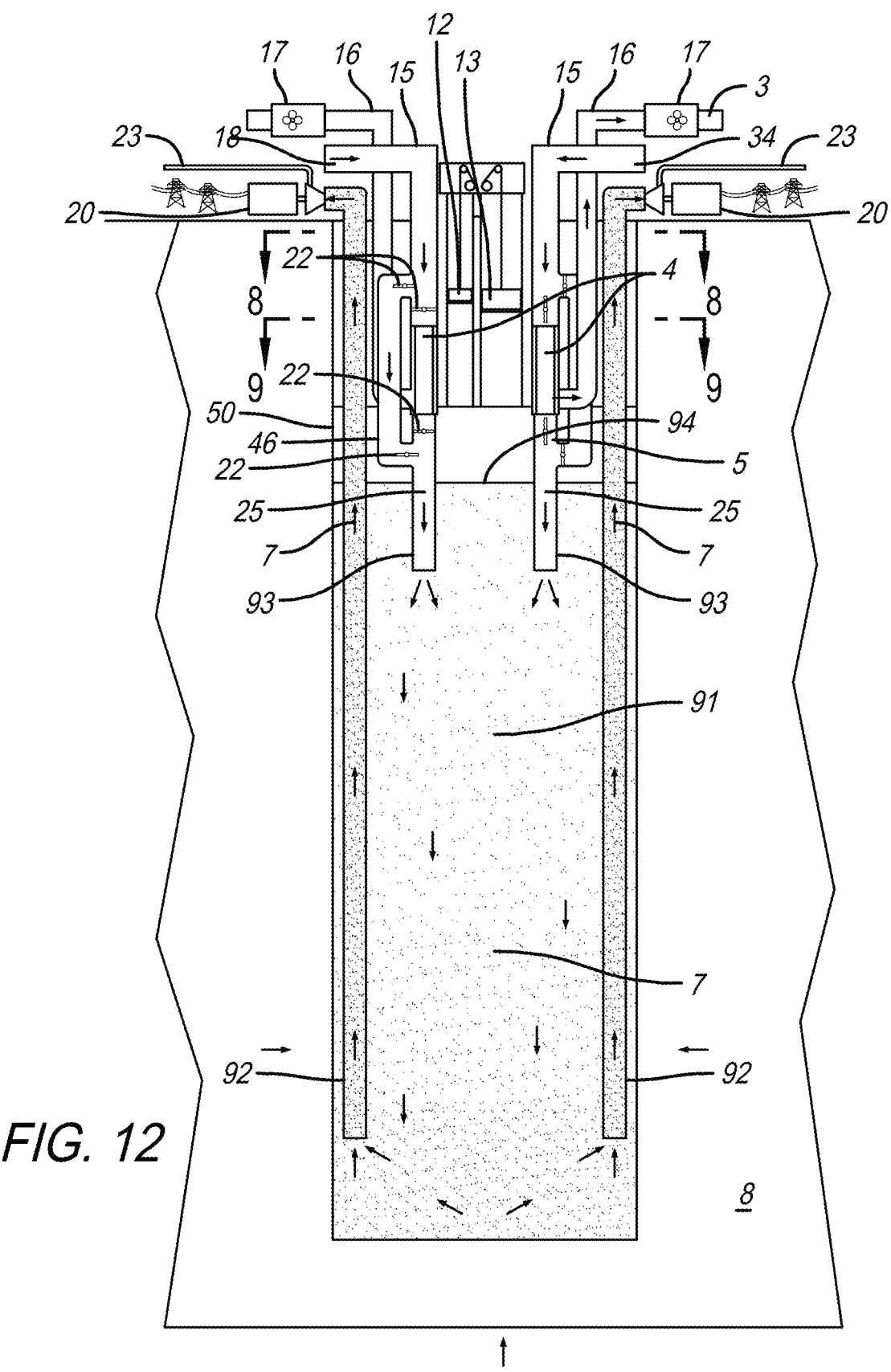
FIG. 12 is a diagram of another system for generating electricity within a subterranean shaft in accordance with a preferred embodiment of the present invention.

FIG. 12 shows another embodiment of a system for generating electricity and providing potable water where the heat transfer fluid discussed above is omitted (or is the water itself). In this embodiment, as shown in FIG. 12, the desalinated seawater 5 and/or by-pass water 18 flow into a pressure chamber 91 via a pressure chamber feed pipe 93 near the pressure chamber top 94. The desalinated seawater 5 and/or by-pass water 18 travel downward towards the bottom of the pressure chamber absorbing heat through the shaft walls transforming the water into high-pressure steam 7.

The high-pressure steam 7 exits the pressure chamber 91 via the proximal end of the high-pressure steam pipe 92 located near the bottom of the high-pressure chamber 91. The high-pressure steam pipe 92 conveys the high-pressure steam 7 to the surface and the distal end of the high-pressure steam pipe is connected to the steam turbine 20 to produce electricity. The high-pressure steam pipe 92 may have a larger diameter pipe starting at the proximal end and progressively reducing in diameter towards the distal end which may increase the velocity of the steam improving the efficiency of the system. The pressure chamber water feed pipe 93 may have a check valve/backflow preventer 25 located downstream of the reverse osmosis apparatus to prevent high-pressure steam from traveling back up the system.

In the FIG. 12 system, the reverse osmosis apparatus is near the surface and the remainder of the shaft/pressure chamber extends thousands of feet into the hot geothermal reservoir. The feed water pipe 93 releases the water near the top of the chamber 91 and the steam return pipe 92 extends all the way to near the bottom of the chamber (the opposite of FIG. 14). The steam return pipe 92 may be insulated inside the chamber from the cold feed water and above the chamber 91 to the surface.

Figure 13:
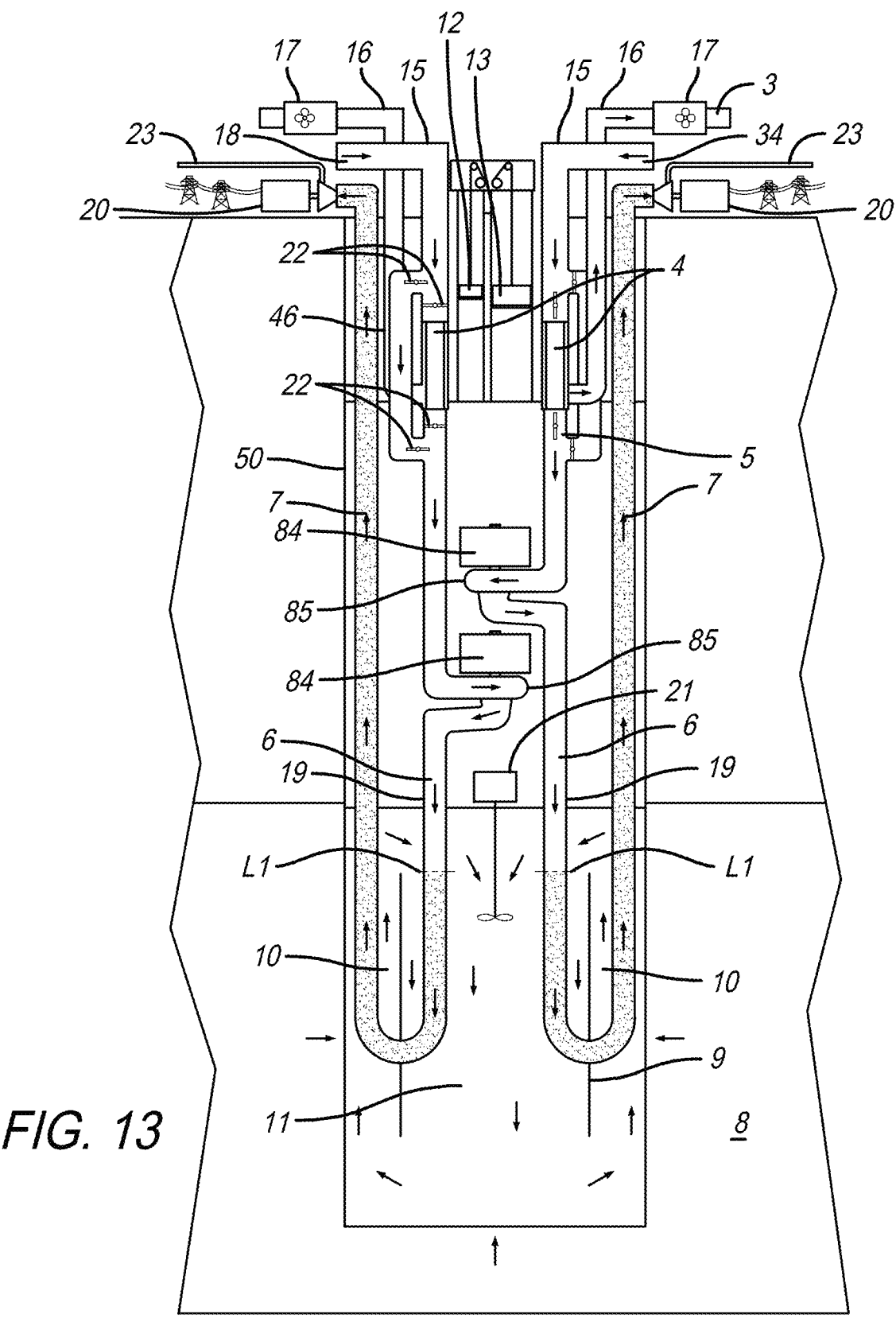
FIG. 13 is a diagram of another system for generating electricity within a subterranean shaft in accordance with a preferred embodiment of the present invention.

FIG. 13 shows another embodiment of the present invention that includes a system for generating electricity and providing potable water and other advantages, as described above with respect to the embodiments shown in FIGS. 1-11. This embodiment includes gravitational flow for desalinating seawater (due to the positioning of the reverse osmosis apparatuses 4 in a vertical orientation), hydroelectric power generation, utilizing geothermal energy for steam turbine power generation housed in a constructed shaft. As shown in FIG. 13, the system may include one or more hydro-electric generators 84 and water turbines 85 positioned in the path of the water intake pipe 15. Due to the depth of the shaft (e.g., thousands of feet), the kinetic energy created by the water traveling down the intake pipes can be harnessed to generate electricity. Therefore, this may provide a first stage for generating electricity and the steam exiting the conduit and passing through the steam turbine may be a second stage for generating electricity. These components may be positioned above the heat transfer fluid and may be included to provide the ability to generate electricity based on the gravitational flow of the water. A bypass mode may also be included for the hydro-electric generators and water turbines. In other words, a conduit, pipe or path, together with valving may be include so that the water moving down the intake conduit 15 is either directed into the hydro-electric generators 84 and water turbines 85 or around the hydro-electric generators and water turbines, thereby bypassing them. The bypass systems discussed herein may be included for the desired results of generating electricity, desalinating water or not, etc. Bypass may also be included so that different components can be worked on while still allowing the overall system to operate.

Figure 14:
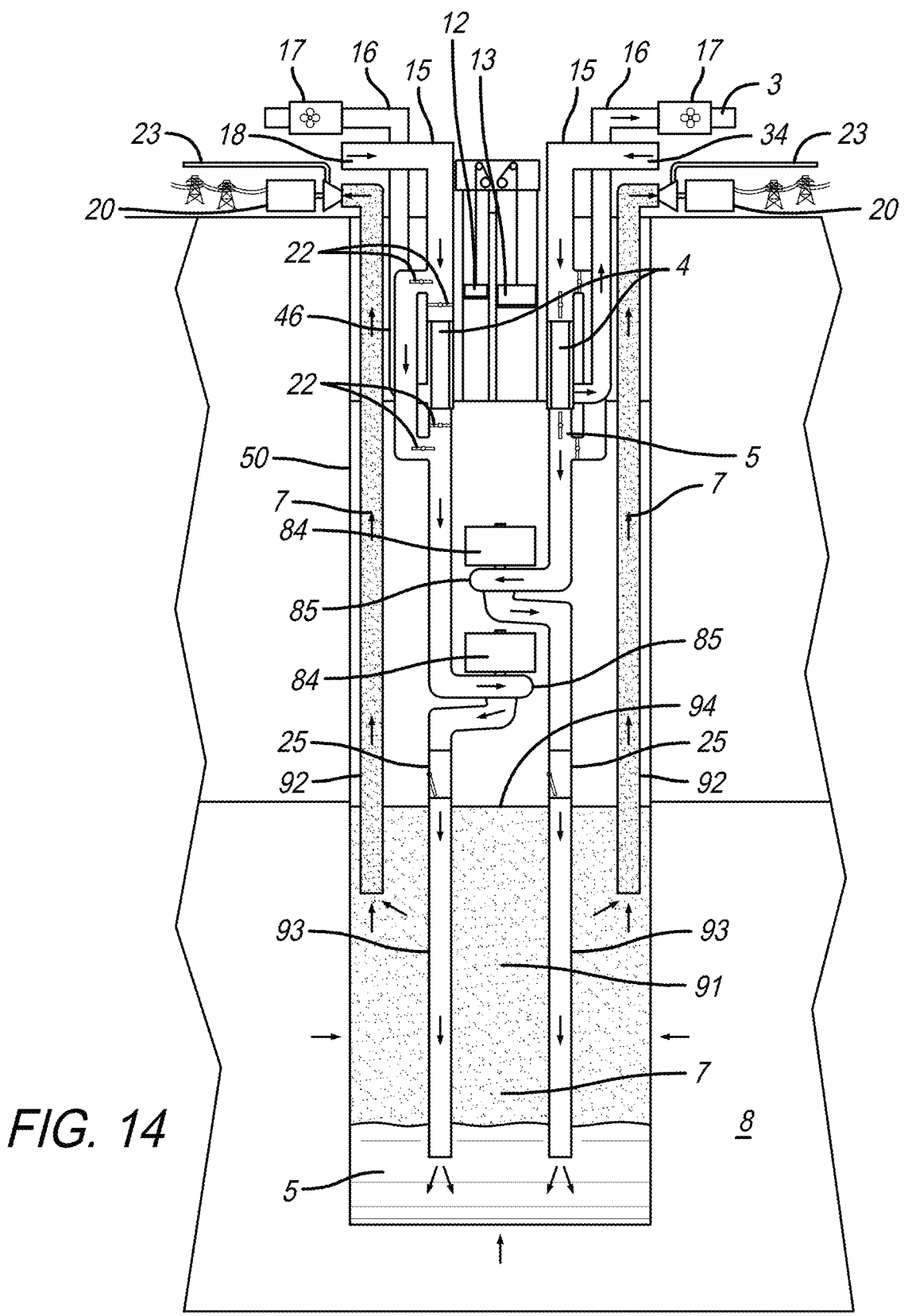
FIG. 14 is a diagram of another system for generating electricity within a subterranean shaft in accordance with a preferred embodiment of the present invention.

FIG. 14 shows another embodiment of the present invention that includes a system for generating electricity and providing potable water and other advantages, but similar to FIG. 12 the heat transfer fluid is omitted (or is the water itself). This embodiment includes gravitational flow for desalinating seawater (due to the positioning of the reverse osmosis apparatuses 4 in a vertical orientation), hydroelectric power generation, utilizing geothermal energy to heat and convert the desalinated seawater 5 into high pressure steam 7 in the pressure chamber 91 for steam turbine power generation housed in a constructed shaft. As shown in FIG. 14, the system may include one or more hydro-electric generators 84 and water turbines 85 positioned in the path of the water intake pipe 15. Due to the depth of the shaft (e.g., thousands of feet), the kinetic energy created by the water traveling down the intake pipes can be harnessed to generate electricity. Therefore, this may provide a first stage for generating electricity and the steam exiting the conduit and passing through the steam turbine may be a second stage for generating electricity. These components may be positioned above the pressure chamber 91, and may be included to provide the ability to generate electricity based on the gravitational flow of the water. A bypass mode may also be included for the hydro-electric generators and water turbines. In other words, a conduit, pipe or path, together with valving may be include so that the water moving down the intake conduit 15 is either directed into the hydro-electric generators 84 and water turbines 85 or around the hydro-electric generators and water turbines, thereby bypassing them. The bypass systems discussed herein may be included for the desired results of generating electricity, desalinating water or not, etc. Bypass may also be included so that different components can be worked on while still allowing the overall system to operate. The pressure chamber 91 is supplied desalinated seawater 5 via the pressure chamber water feed pipe 93. The pressure chamber feed water pipe 93 extends the bottom of the pressure chamber 91. Desalinated seawater 5 boils at the bottom of the pressure chamber 91 creating high-pressure steam 7.

The high-pressure steam 7 exits the pressure chamber via the proximal end of the high-pressure steam pipe 92 located near the high-pressure chamber top 94. The high-pressure steam pipe 92 conveys the high-pressure steam 7 to the surface and distal end of the high-pressure steam pipe 92 is connected to the steam turbine 20 to produce electricity.

The high-pressure steam pipe 92 may have a larger diameter pipe starting at the proximal end and progressively reducing in diameter towards the distal end which may increase the velocity of the steam improving the efficiency of the system. The pressure chamber water feed pipe 93 may have a check valve/backflow preventer 25 located downstream of the hydro-electric turbine apparatus to prevent high-pressure steam from traveling back up the system.

In the FIG. 14 system, the hydro-electric generators 84 and water turbines 85 may be positioned near the bottom of the shaft, not leaving much room for the pressure chamber 91 discussed with reference to FIG. 12. Therefore, in this embodiment, the feed water pipe 93 extends to near the bottom of the chamber 91 and the steam return pipe 92 is closer to the top of the chamber 91.

Figure 15:
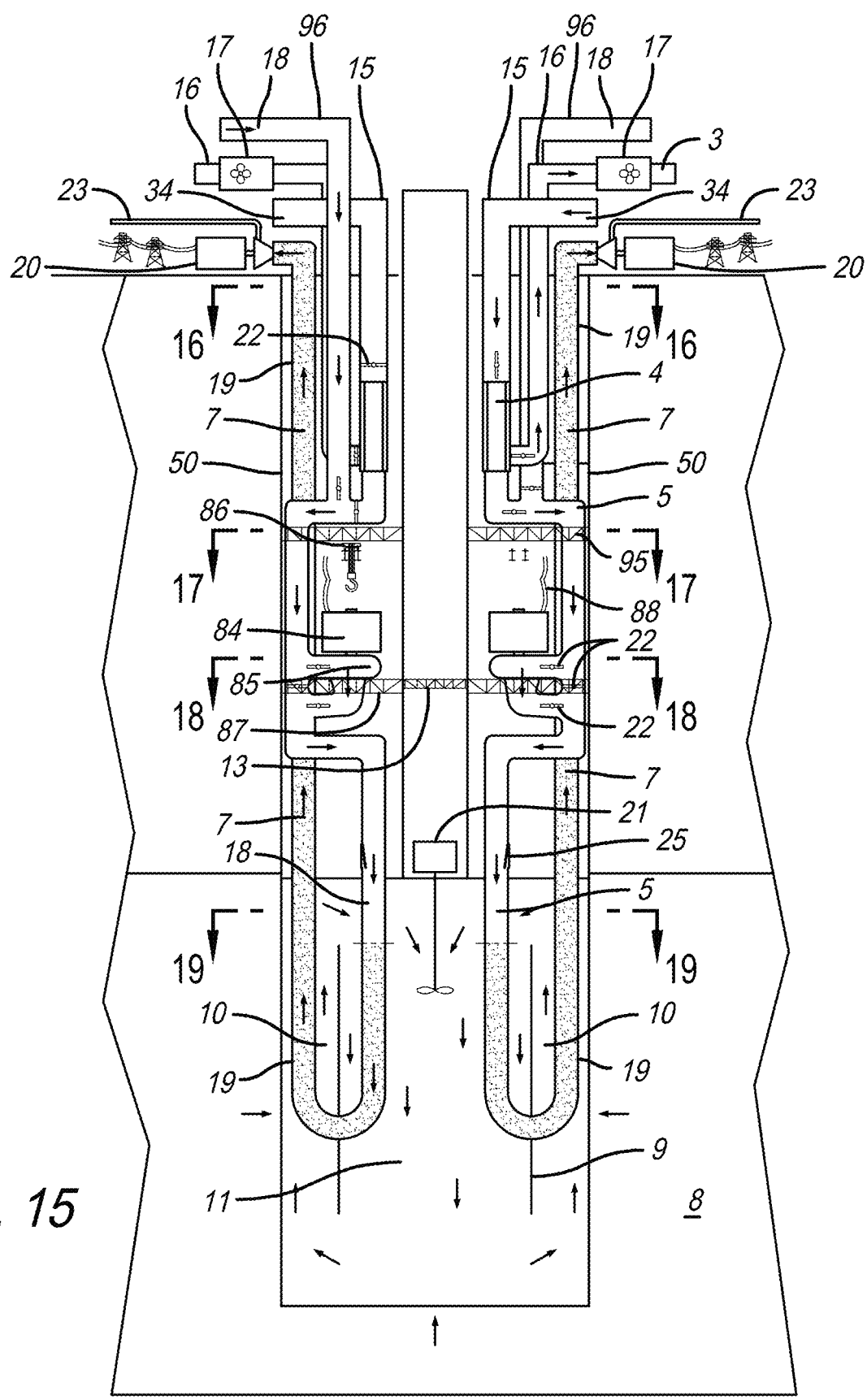
FIG. 15 is a diagram of another system for generating electricity within a subterranean shaft and with an equipment elevator centrally located in the shaft in accordance with a preferred embodiment of the present invention.

FIG. 15 shows another embodiment of the present invention that includes a system for generating electricity and providing potable water and other advantages. Generally, the system shown in FIG. 15 is a system for utilizing gravitational flow for desalinating seawater using reverse osmosis and including hydro-electric power generation and utilizing geothermal energy for steam turbine power generation disposed in a shaft. The system shown in FIG. 15 (or each subsystem) includes a separate bypass intake conduit or pipe 96 where the bypass water 18 enters the system and joins the intake conduit or pipe 15 after the reverse osmosis apparatus 4. This differs from previous systems where there is a bypass section that branches off from the intake pipe 15 to bypass the reverse osmosis device. The separate bypass pipe allows the system to quickly switch from seawater to bypass fluid minimizing water starvation in the system which could possibly harm the system and cause pipes to rupture, especially the pipes submerged in the heat transfer fluid 10 and 11.

As shown in FIG. 15, the plumbing may be arranged differently at the hydro-electric levels with an equipment elevator 95 centrally located in the shaft 50 (similar in operation as the ones used on aircraft carriers). The equipment elevator may include equipment hoist and rails 86 and one or more equipment platforms 87. The hydroelectric electricity 88 is also shown. The arrangement allows for the generator and turbine equipment to be hoisted from their respective positions and loaded on to the elevator so they can be replaced or repaired. A crane hoist and rails and a floor platform structure may also be included. Depending on the depth of the shaft there may be many stages of hydro-electric turbines for each sub-system.

Figure 16:
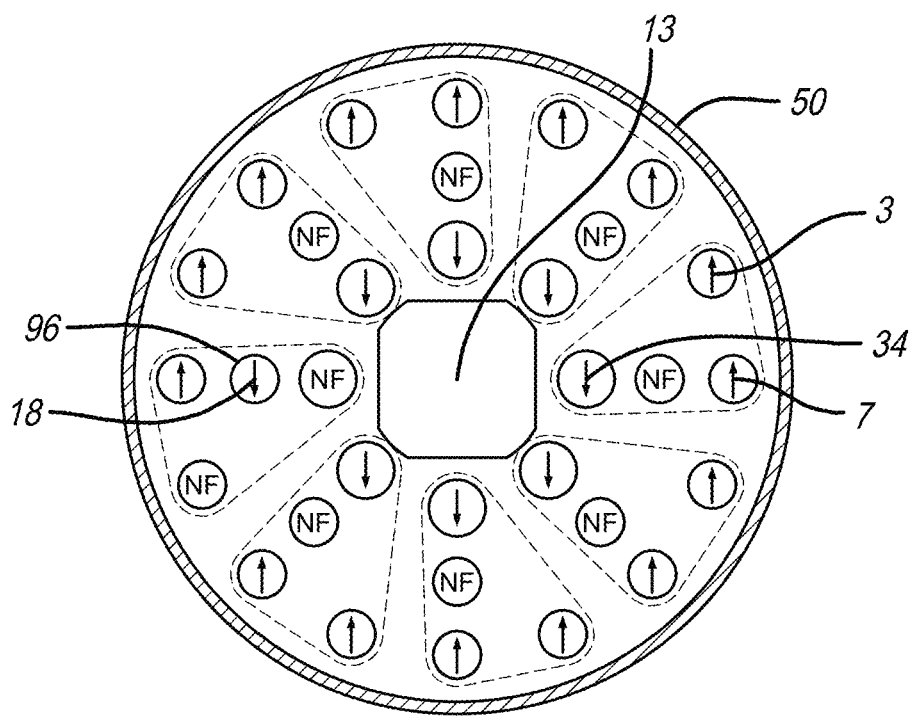
FIG. 16 is a cross-section taken along line 16-16 of FIG. 15.

FIG. 16 is a cross-section taken along line 16-16 of FIG. 15. The up arrows in FIGS. 16-20 represent upward flow, the down arrows represent downward flow and the NF designation represents no flow. In FIG. 16, the subsystem that includes the bypass pipe labeled 96 is shown in bypass mode. The other subsystems are in regular mode or are desalinating the seawater 34.

Figure 17:
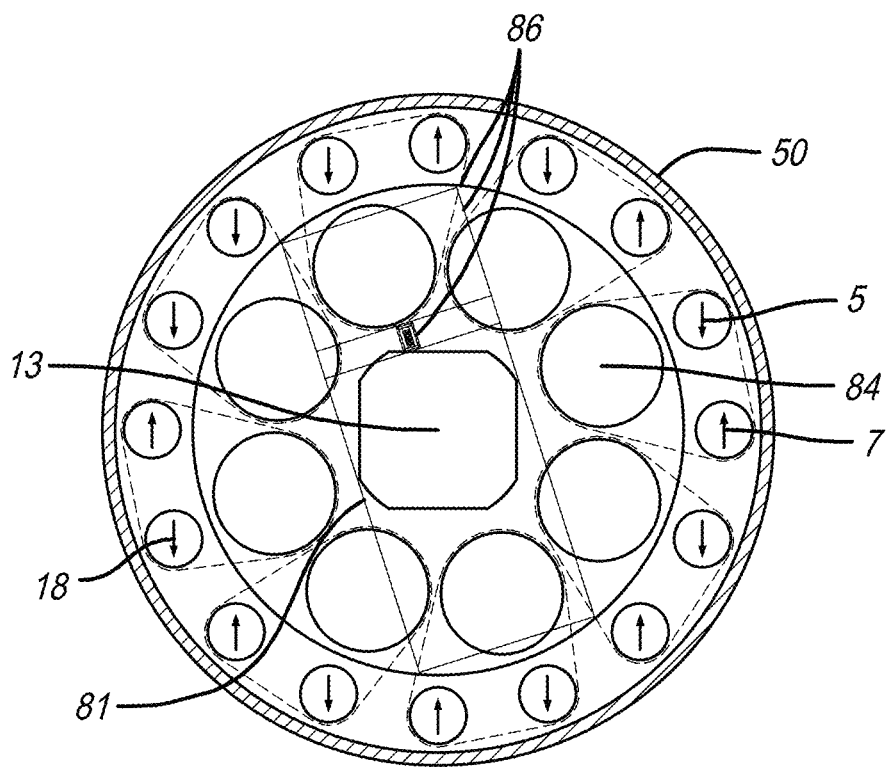
FIG. 17 is is a cross-section taken along line 17-17 of FIG. 15.
Figure 18:
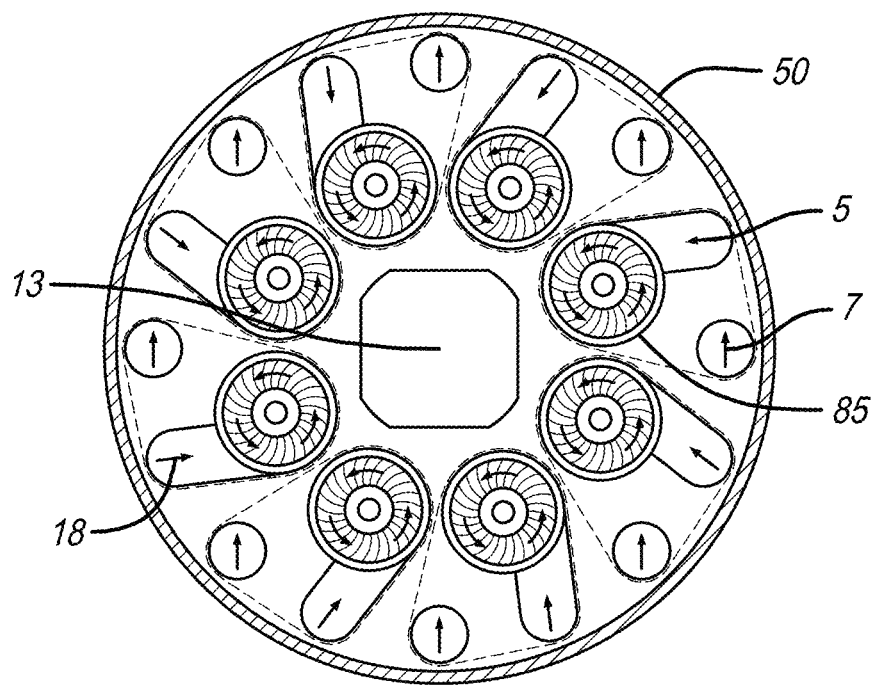
FIG. 18 is a cross-section taken along line 18-18 of FIG. 15.
Figure 19:
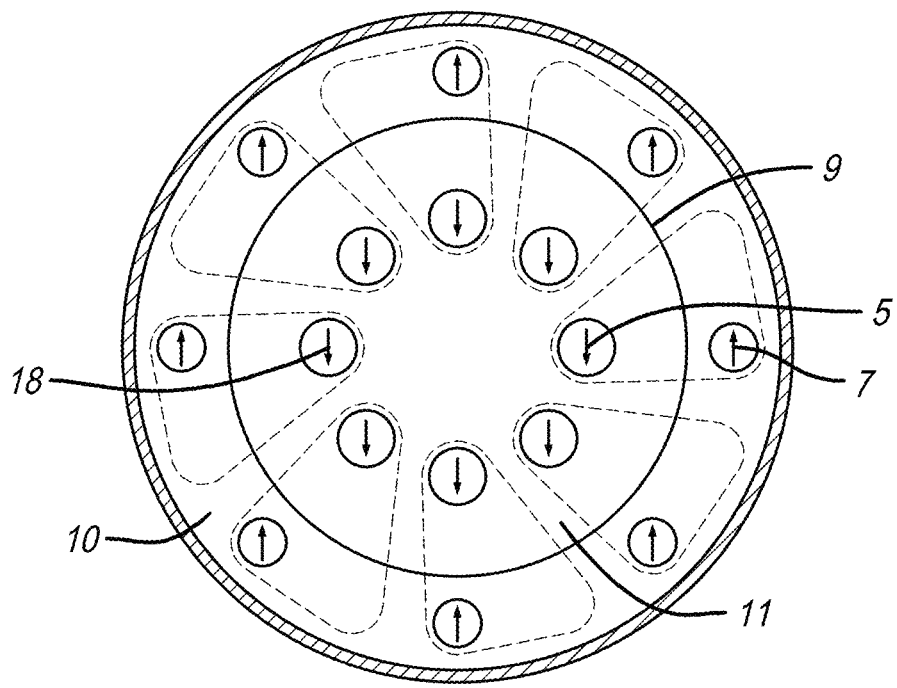
FIG. 19 is a cross-section taken along line 19-19 of FIG. 15.

FIG. 17 is a cross-section taken along line 17-17 of FIG. 15 and shows the hydro-electric generators 84, the equipment elevator 13 and the rails 86. FIG. 18 is a cross-section taken along line 18-18 of FIG. 15 and shows the water turbines 85 and equipment elevator 13. The arrows in FIG. 18 that are not pointing up or down and are pointing toward one of the water turbines 85 represent flow into the water turbine. The drawings show a Francis/Kaplan style water turbine. However, this is not a limitation and other types of turbines may be used, such as a Pelton type turbine. FIG. 19 is a cross-section taken along line 19-19 of FIG. 15 and shows the fluid duct 9 in the heat transfer fluid 10 and 11.

Figure 20:
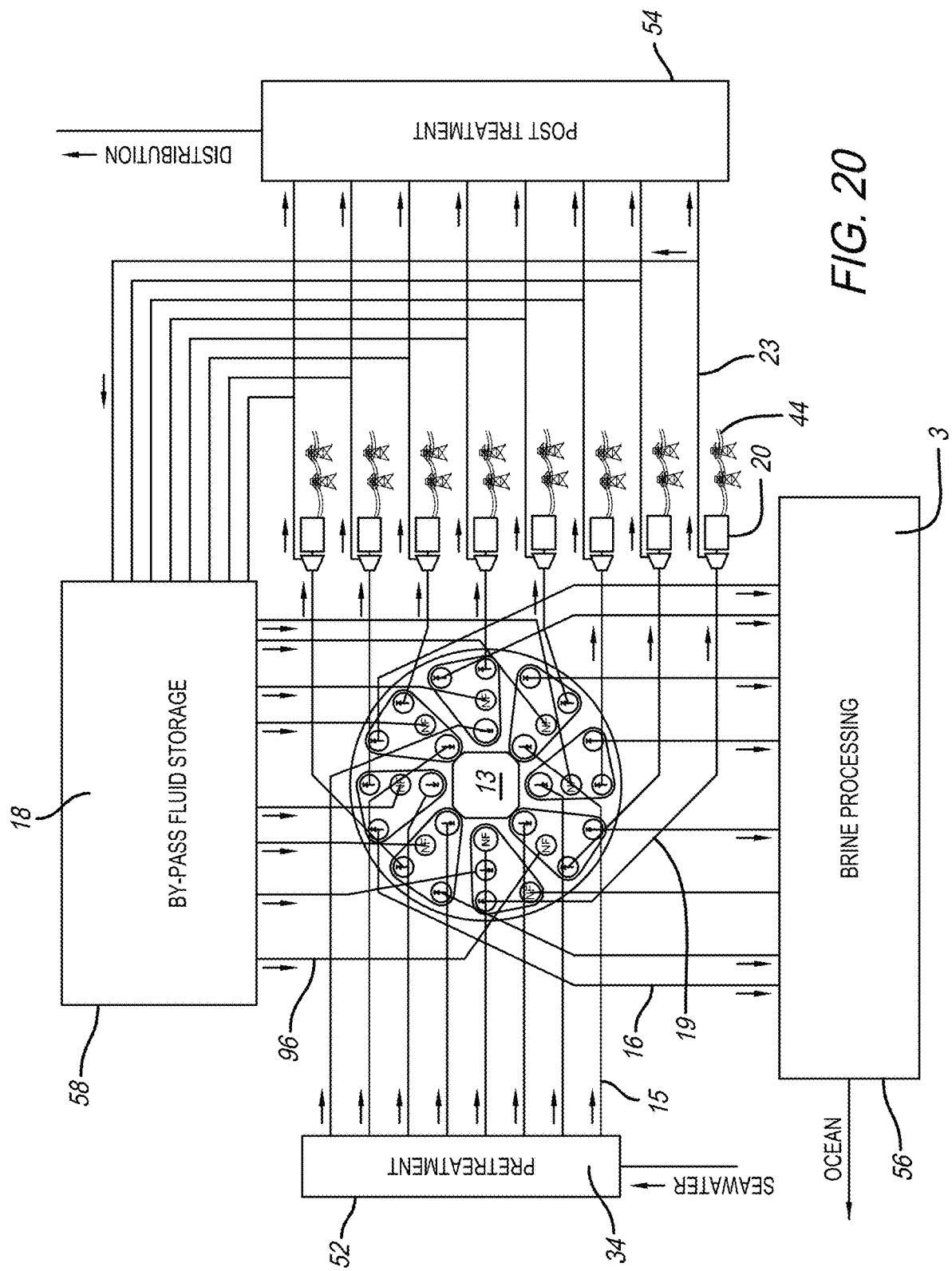
FIG. 20 is a schematic diagram of the system of FIG. 15 and including pretreatment and posttreatment facilities.

FIG. 20 shows a pre-treatment facility 52 and a post-treatment facility 54, a brine processing facility 56 and bypass fluid storage 58 together with a shaft 50 that includes a eight subsystems therein. The intake conduit 15 for seawater, the bypass intake pipe 96 for the bypass/non-seawater fluid 18, steam conduit 19 and brine return pipe 16 are numbered and shown. The paths of condensate water 23, brine 3, seawater 34 and bypass fluid 18 are also shown. The shaft portion of FIG. 20 includes the cross-section of FIG. 16.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 96, other aspects may likewise be embodied as a means-plus-function claim, or in other forms, such as being embodied in a computer-readable medium. (Any claims intended to be treated under 35 U.S.C. § 112, 96 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A system for generating electricity, the system comprising:
    a subterranean shaft defined from a surface of earth to a shaft bottom, wherein the subterranean shaft defines a shaft interior and a shaft length between the surface of earth and the shaft bottom, wherein at least a portion of the shaft extends into a geothermal reservoir, wherein a top of the geothermal reservoir defines a geothermal reservoir level,
    a volume of heat transfer fluid disposed in the shaft interior and defining a heat transfer fluid level, wherein at least a portion of the volume of heat transfer fluid is disposed below the geothermal reservoir level, wherein heat from the geothermal reservoir is transferred through a wall of the subterranean shaft and into the volume of heat transfer fluid,
    at least a first water intake conduit extending from the surface of the earth into the shaft interior, wherein the first water intake conduit includes a proximal end, a downward portion, a return portion, an upward portion and a distal end, wherein the return portion, at least a portion of the downward portion and at least a portion of the upward portion are positioned in the volume of heat transfer fluid,
    an electrical generation stage associated with the distal end of the water intake conduit, wherein a water path is defined from the proximal end of the water intake conduit, through the downward portion, through the return portion, through the upward portion and to the electrical generation stage,
    a fluid duct disposed in the volume of heat transfer fluid, wherein the fluid duct defines a fluid duct interior and includes an entrance at a top of the fluid duct and an exit at a bottom of the fluid duct, wherein heat transfer fluid enters the entrance of the fluid duct and exits the exit of the fluid duct, wherein heat transfer fluid in the fluid duct interior is cooler than heat transfer fluid outside of the fluid duct, wherein the downward portion of the water intake conduit extends through the entrance of the fluid duct and into the fluid duct interior, wherein the return portion of the water intake conduit extends through a wall of the fluid duct at a location between the entrance and the exit, wherein the upward portion of the water intake conduit is positioned outside of the fluid duct interior,
    wherein liquid water received through the proximal end of the first water intake conduit moves downwardly along the downward portion of the water intake conduit and below the heat transfer fluid level, wherein the liquid water is converted to steam via heat transfer from the volume of heat transfer fluid through a wall of the first water intake conduit, wherein the steam moves upwardly along the upward portion of the water intake conduit and into the electrical generation stage, whereby electricity is generated.

2. The system of claim 1 wherein the electrical generation stage includes at least one turbine coupled to a generator.

3. The system of claim 1 wherein the subterranean shaft includes a generally constant diameter.

4. The system of claim 1 further comprising at least a first desalinating apparatus associated with the downward portion of the water intake conduit, wherein the water path includes water moving through the first desalinating apparatus.

5. The system of claim 4 further comprising a bypass path, wherein the water path includes water moving through the first desalinating apparatus or water bypassing the first desalinating apparatus.

6. The system of claim 4 wherein the first desalinating apparatus is positioned vertically within the downward portion of the water intake conduit, whereby water moves to and through the first osmosis apparatus via gravity.

7. The system of claim 4 further comprising a brine return system coupled to the first desalinating apparatus, the brine return system configured for moving brine from the first desalinating apparatus out of the subterranean shaft.

8. The system of claim 4 wherein a first portion of the shaft below the heat transfer fluid level defines a first diameter, wherein the first desalinating apparatus is positioned in a portion of the subterranean shaft that defines a second diameter, wherein the second diameter is larger than the first diameter.

9. The system of claim 4 wherein the first desalinating apparatus is a reverse osmosis apparatus.

10. The system of claim 1 further comprising at least a first hydroelectric generator associated with the downward portion of the water intake conduit, and wherein the water path includes moving through the first hydroelectric generator, whereby electricity is generated.

11. The system of claim 1 wherein the subterranean shaft includes a plurality of panels that at least partially define the shaft interior, wherein the plurality of panels include a first conductive panel section and a first insulative panel section, wherein the first conductive panel section is located below the heat transfer fluid level, and wherein the first insulative panel section is located above the first conductive panel section.

12. A system for generating electricity, the system comprising:
    a subterranean shaft defined from a surface of earth to a shaft bottom, wherein the subterranean shaft defines a shaft interior and a shaft length between the surface of earth and the shaft bottom, wherein at least a portion of the shaft extends into a geothermal reservoir, wherein a top of the geothermal reservoir defines a geothermal reservoir level, wherein the subterranean shaft includes a generally constant diameter, a volume of heat transfer fluid disposed in the shaft interior and defining a heat transfer fluid level, wherein at least a portion of the volume of heat transfer fluid is disposed below the geothermal reservoir level, wherein heat from the geothermal reservoir is transferred through a wall of the subterranean shaft and into the volume of heat transfer fluid, at least a first water intake conduit extending from the surface of the earth into the shaft interior, wherein the first water intake conduit includes a proximal end, a downward portion, a return portion, an upward portion and a distal end, wherein the return portion, at least a portion of the downward portion and at least a portion of the upward portion are positioned in the volume of heat transfer fluid, at least a first desalinating apparatus positioned vertically within the downward portion of the water intake conduit, whereby water moves to and through the first osmosis apparatus via gravity, an electrical generation stage associated with the distal end of the water intake conduit, wherein a water path is defined from the proximal end of the water intake conduit, through the downward portion, through the first desalinating apparatus, through the return portion, through the upward portion and to the electrical generation stage, a fluid duct disposed in the volume of heat transfer fluid, wherein the fluid duct defines a fluid duct interior and includes an entrance at a top of the fluid duct and an exit at a bottom of the fluid duct, wherein heat transfer fluid enters the entrance of the fluid duct and exits the exit of the fluid duct, wherein heat transfer fluid in the fluid duct interior is cooler than heat transfer fluid outside of the fluid duct, wherein the downward portion of the water intake conduit extends through the entrance of the fluid duct and into the fluid duct interior, wherein the return portion of the water intake conduit extends through a wall of the fluid duct at a location between the entrance and the exit, wherein the upward portion of the water intake conduit is positioned outside of the fluid duct interior, a brine return system coupled to the first desalinating apparatus, the brine return system configured for moving brine from the first desalinating apparatus out of the subterranean shaft, wherein liquid water received through the proximal end of the first water intake conduit moves downwardly along the downward portion of the water intake conduit and below the heat transfer fluid level, wherein the liquid water is converted to steam via heat transfer from the volume of heat transfer fluid through a wall of the first water intake conduit, wherein the steam moves upwardly along the upward portion of the water intake conduit and into the electrical generation stage, whereby electricity is generated.

13. The system of claim 12 further comprising a bypass path, wherein the water path includes water moving through the first desalinating apparatus or water bypassing the first desalinating apparatus.

14. The system of claim 1 further comprising a circulating pump, at least a portion of which is located in the fluid duct interior, wherein the circulating pump moves heat transfer fluid in the fluid duct interior downwardly toward the exit of the fluid duct.

* * * * *